(12) United States Patent
Won

(10) Patent No.: US 9,595,238 B2
(45) Date of Patent: Mar. 14, 2017

(54) ELECTRONIC DEVICE, COVER FOR ELECTRONIC DEVICE, AND METHOD OF PERFORMING A FUNCTION IN AN ELECTRONIC DEVICE

(71) Applicant: Samsung Electronics Co., Ltd., Suwon-si, Gyeonggi-do (KR)

(72) Inventor: Sung-Joon Won, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/477,044

(22) Filed: Sep. 4, 2014

(65) Prior Publication Data
US 2015/0154935 A1    Jun. 4, 2015

(30) Foreign Application Priority Data
Dec. 3, 2013    (KR) .................. 10-2013-0149388

(51) Int. Cl.
| | |
|---|---|
| *G09G 5/00* | (2006.01) |
| *G09G 5/36* | (2006.01) |
| *G06F 1/16* | (2006.01) |
| *G06F 3/048* | (2013.01) |
| *G09G 5/14* | (2006.01) |
| *G06F 3/0488* | (2013.01) |

(52) U.S. Cl.
CPC ........... *G09G 5/006* (2013.01); *G06F 1/1626* (2013.01); *G06F 3/048* (2013.01); *G06F 3/0488* (2013.01); *G09G 5/14* (2013.01); *G09G 5/36* (2013.01); *G09G 5/363* (2013.01); *G06F 2200/1634* (2013.01); *G06F 2203/04803* (2013.01); *G09G 2320/0613* (2013.01); *G09G 2320/10* (2013.01); *G09G 2340/14* (2013.01); *G09G 2354/00* (2013.01)

(58) Field of Classification Search
CPC ........... G06F 3/016; G06F 3/011; G06F 3/038
USPC ................................ 345/156–158, 204, 619
See application file for complete search history.

(56) References Cited

U.S. PATENT DOCUMENTS

| | | | | |
|---|---|---|---|---|
| 8,988,395 | B2 * | 3/2015 | Soo ....................... | G06F 3/0416 178/18.01 |
| 2006/0139325 | A1 * | 6/2006 | Wang .................... | G06F 1/1626 345/158 |
| 2007/0091004 | A1 * | 4/2007 | Puuri ..................... | H01Q 13/10 343/718 |
| 2011/0216032 | A1 * | 9/2011 | Oda ........................ | G06F 3/044 345/174 |
| 2011/0279961 | A1 * | 11/2011 | Shedletsky ............ | G06F 3/044 361/679.21 |
| 2013/0162668 | A1 | 6/2013 | Lauder et al. | |
| 2014/0192467 | A1 * | 7/2014 | Kwong ................. | G06F 1/1601 361/679.3 |

(Continued)

*Primary Examiner* — Kimnhung Nguyen
(74) *Attorney, Agent, or Firm* — Jefferson IP Law, LLP

(57) ABSTRACT

An electronic device, a cover of the electronic device, and a method of performing a function in the electronic device is provided. The electronic device includes a display unit configured to display information and a controller configured to detect whether a display screen is covered with one or more parts a cover covering the display unit, and to perform a predetermined function if the display screen is covered with the one or more parts of the cover. Another embodiment may be implemented at any amount.

19 Claims, 27 Drawing Sheets

(56) References Cited

U.S. PATENT DOCUMENTS

2015/0212651 A1\* 7/2015 Lee .................... G06F 3/03545
345/178

\* cited by examiner

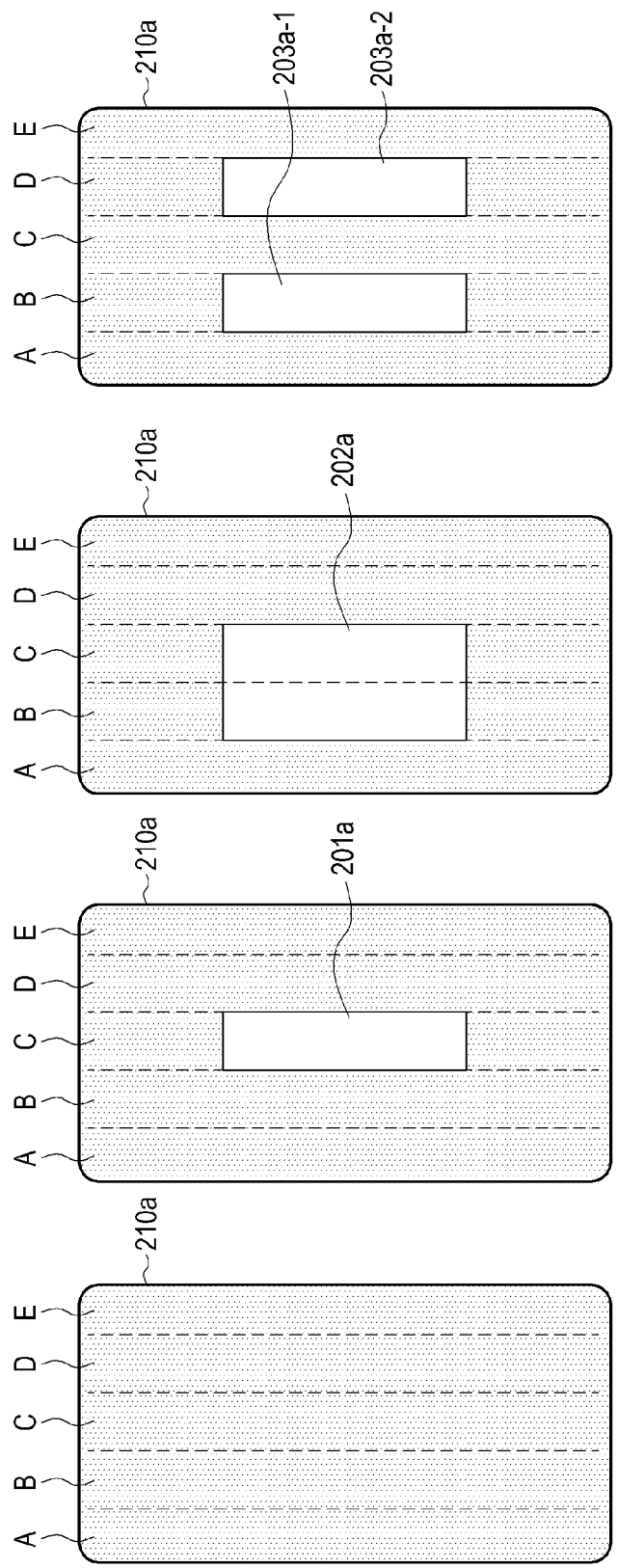

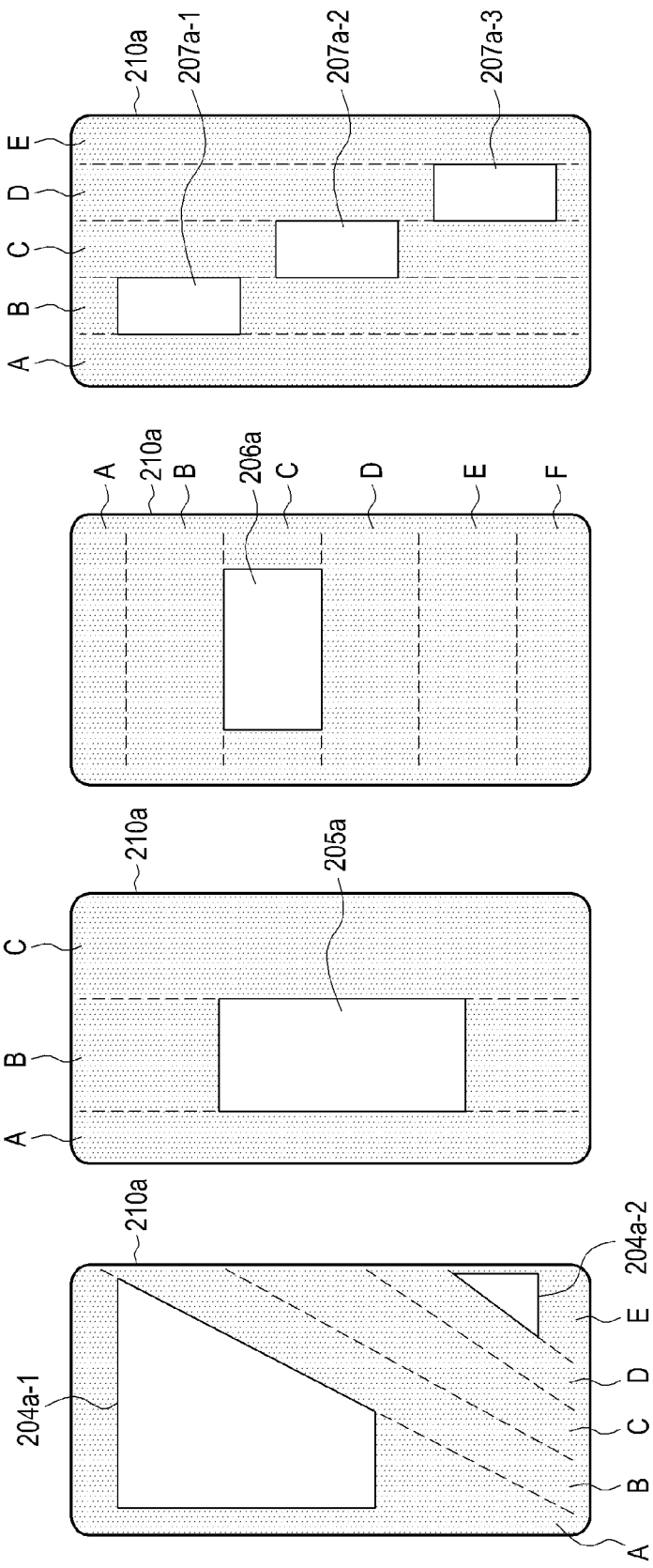

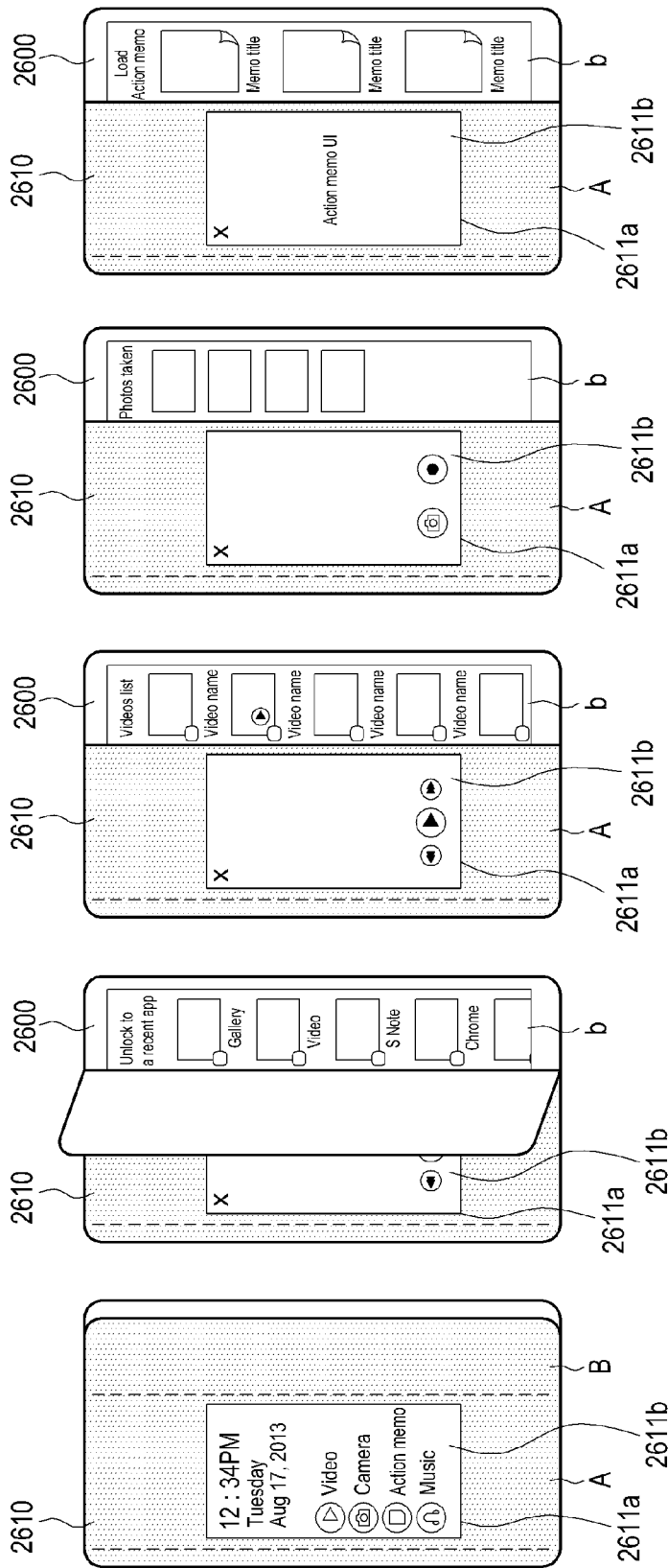

ELECTRONIC DEVICE, COVER FOR ELECTRONIC DEVICE, AND METHOD OF PERFORMING A FUNCTION IN AN ELECTRONIC DEVICE

CROSS-REFERENCE TO RELATED APPLICATION(S)

This application claims the benefit under 35 U.S.C. §119 (a) of a Korean patent application filed on Dec. 3, 2013 in the Korean Intellectual Property Office and assigned Serial number 10-2013-0149388, the entire disclosure of which is hereby incorporated by reference.

TECHNICAL FIELD

The present disclosure relates to an electronic device. More particularly, the present disclosure relates to an electronic device, a cover for an electronic device, and a method of performing a function in an electronic device.

BACKGROUND

An electronic device such as a smartphone, a personal computer, a tablet Personal Computer (PC) and the like has provided various useful functions through various applications to a user. The electronic device has been changed to include a voice call function and various kinds of information can be used through a service provided by the device. For example, such an electronic device may be provided along with a cover for protecting the electronic device.

The cover of the electronic device has been developed to cover a display screen of the electronic device. However, as the display screen of the electronic device recently has been enlarged and curved, it is required that the cover has a structure of covering a part of a surface of the display screen.

In the cover that entirely covers the display screen of the related art, there is a problem in that the display screen cannot be identified when the electronic device is covered or closed with the cover. Accordingly, although the electronic device is covered or closed with a cover, it is required that at least a part of the display screen of the electronic device can be viewed.

However, the electronic device generally cannot distinguish between a screen that is entirely covered from a screen that is partially covered. Thus, the electric device cannot distinctively perform operations corresponding to the status of the display screen entirely covered with the cover and the status of the display screen partially covered with the cover.

Further, even in the case where the cover has a window through which a user views a part of the display screen of the electronic device when the display screen is covered with the cover, the electronic device cannot recognize which area of the display screen corresponds to the window of the cover. Therefore, the electronic device cannot control the area corresponding to the window of the cover to display contents or applications depending on a status of the display screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, a cover for the electronic device, and a method of performing a function in the electronic device, which is capable of distinguishing a display screen that is entirely covered and the display screen that is partially covered, and makes the display screen differently operate according to the status thereof entirely covered with the cover or the status thereof partially covered with the cover.

Another aspect of the present disclosure is to provide an electronic device, a cover for the electronic device and a method of performing a function in the electronic device, in which the cover has a window through which a display screen is partially viewed when the display screen of the electronic device is covered with the cover, and the electronic device can recognize which area of the display screen corresponds to the window of the cover, thereby controlling the display screen to display contents or applications on the area thereof corresponding to the window of the cover even when the display screen of the electronic device is covered with the cover.

Another aspect of the present disclosure is to provide an electronic device, a cover for the electronic device, and a method of performing a function in the electronic device, in which the electronic device can distinguish an area of a display screen covered with the cover from an area of the display screen which is not covered with the cover when the cover covers the display screen of the electronic device, and a part of the display screen of the electronic device is viewed through a window of the cover, so as to display contents or applications.

In accordance with an aspect of the present disclosure, an electronic device is provided. The electronic device includes a display unit configured to display information and a controller configured to detect whether a display screen is covered with one or more parts of a cover covering the display unit, and to perform a predetermined function if the display screen is covered with the one or more parts of the cover.

In accordance with another aspect of the present disclosure, a method of performing a function is provided. The method includes detecting whether at least one part of a cover of an electronic device covers on a display screen and performing a predetermined function depending on a status of the cover when the at least one part covers the display screen or is open.

In accordance with still another aspect of the present disclosure, a cover of an electronic device is provided. The cover of the electronic device includes a plurality of cover regions that are separately moveable, wherein the cover regions are selectively configured to cover a display unit of the electronic device, and at least one cover region of the cover regions includes at least one window.

According to the various embodiments of the present disclosure, since the cover of the electronic device is configured to have one or more parts, it is convenient for a user to cover the display unit of the electronic device with each part of the cover when the electronic device is covered.

According to the various embodiments of the present disclosure, further, since at least one window is formed in one of the parts of the cover, there is an advantage in that a user can view information displayed on the display unit through the at least one window even though the display unit of the electronic device is covered.

According to the various embodiments of the present disclosure, further, it is possible for the electronic device to determine which part of the one or more parts of the cover covers a specific area of the display unit and to perform the function according to the part of the cover covering the specific area of the display unit.

According to the various embodiments of the present disclosure, further, it is possible to control a display of the display screen of the display unit corresponding to the window of the cover according to the status of the cover, which has one or more parts, of which a part having the window covers the display unit or is open.

According to the various embodiments of the present disclosure, furthermore, it is possible for a user to set which information is displayed on an area of the display unit of the electronic device corresponding to the window of the cover.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, 2C, 2D, 3A, 3B, 3C, and 3D are views illustrating a front cover unit having at least one window attached thereto and one or more parts divided thereon according to various embodiments of the present disclosure;

FIGS. 26A, 26B, 26C, 26D, 26E, 27A, and 27B are views illustrating a display of the electronic device depending on the status of the cover which covers the electronic device or is open according to the eleventh embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, the descriptions of known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the various embodiments of the present disclosure has a display unit and a cover for covering the display unit, which may include a video phone, a portable phone, a smart phone, an International Mobile Telecommunication (IMT) 2000 terminal, a Wideband Code Division Multiple Access (WCDMA) terminal, an Universal Mobile Telecommunication Service (UMTS) terminal, a Personal Digital Assistant (PDA) terminal, a Portable Multimedia Player (PMP), a Digital Multimedia Broadcasting (DMB) terminal, an E-book reader, a portable computer such as a laptop computer, a tablet Personal Computer (PC) and the like, a digital camera, and the like.

In an embodiment of the present disclosure, a cover of an electronic device may comprise a plurality of cover regions that are separately moveable, wherein the cover regions are selectively configured to cover a display unit of the electronic device, and at least one cover region of the cover regions includes at least one window.

Figure 1A:
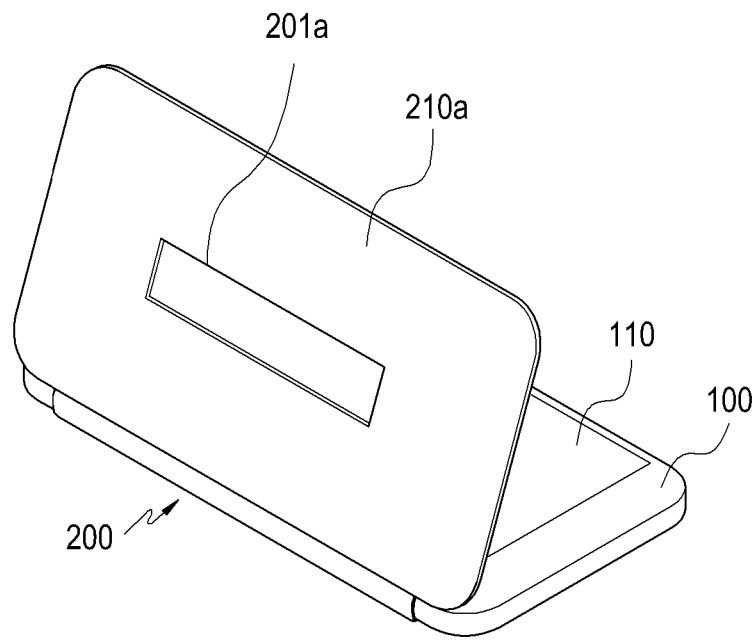
FIGS. 1A and 1B are perspective views illustrating an electronic device having a cover coupled therewith according to various embodiments of the present disclosure.
Figure 1B:
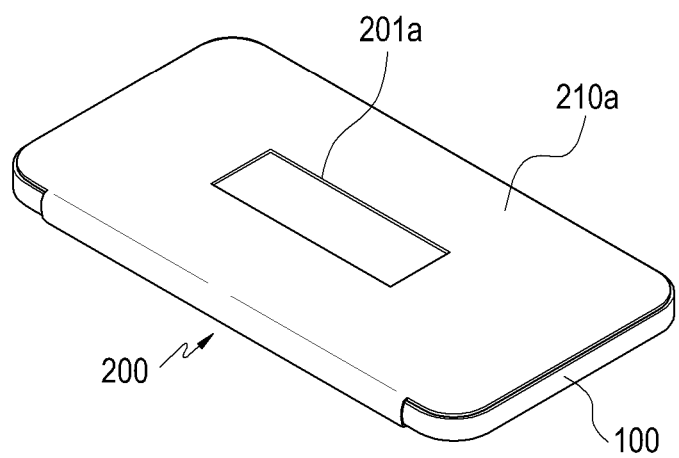

FIGS. 1A and 1B are perspective views illustrating an electronic device having a cover coupled therewith according to various embodiments of the present disclosure.

Referring to FIGS. 1A and 1B, the electronic device 100 may be coupled with the cover 200. The electronic device 100 may have a display unit 110, which displays various functions and the like on a front surface thereof. The cover 200 may cover the front surface and/or the rear surface of the electronic device 100. When the cover 200 covers the electronic device 100, the cover 200 may cover all or a part of the display unit 110 so that other parts can be exposed. On the exposed parts of the screen of the display unit 110, contents such as a clock, a message, numbers, a received phone number, or a user environment may be displayed.

For example, a front cover unit 210a may entirely cover the front surface of the electronic device 100, and may be provided with a screen projection unit (hereinafter, referred to as a 'window') 201a through which the entire screen or a part of the screen of the display unit 110 is exposed. The window 201a may be made of a transparent material or be perforated in the form of an opening so that a user can visually perceive the display unit 110 when the cover 200 covers the front surface of the display unit 110. For example, the window 201a may be a transparent window or an open cutout window. Thus, the user can visually perceive the display unit 110 through the window 201a. Accordingly, it is possible to identify and execute contents displayed on the display unit 110, for example, brief contents such as weather, data, time, a received message, a phone number according to a voice call, a user environment set by the user, and the like, through the window 201a.

In the embodiment of the present disclosure, the window 201a is provided on a side of the front cover unit 210a. However, the window 201a is not limited thereto and may be provided at a center portion or a lower side of the front cover unit 210a. That is, the window 201a may be formed at any position of the front cover unit 210a. In the embodiment, it is possible to provide plural windows on the front cover unit 210a.

According to the various embodiments of the present disclosure, the front cover unit 210a of the electronic device 100 may be distinguished into one or more parts, and some parts or entire parts of the front cover unit 210a may cover the front surface of the electronic device 100.

FIGS. 2A, 2B, 2C, and 2D and 3A, 3B, 3C, and 3D are views illustrating the front cover unit having at least one window attached thereto and one or more parts divided thereon according to various embodiments of the present disclosure.

Referring to FIG. 2A, the front cover unit 210a has no window, and has five parts A, B, C, D and E divided thereon. Referring to FIG. 2B, the front cover unit 210a has the window 201a at a center portion thereof, and has five parts A, B, C, D and E divided thereon. Referring to FIG. 2C, the front cover unit 210a has a window 202a on a left side thereof, and has five parts A, B, C, D and E divided thereon. Referring to FIG. 2D, the front cover unit 210a has a first window 203a-1 and a second window 203a-2 on left and right sides thereof, and has five parts A, B, C, D and E divided thereon.

In the case that the front cover unit 210a is configured as shown in FIGS. 2A, 2B, 2C and 2D, the front cover unit 210a may entirely cover the front surface of the electronic device 100, and the part A, the part B, the part C, the part D and the part E may sequentially cover the front surface of the electronic device 100. For example, the front cover unit 210a may entirely cover the front surface of the electronic device 100 with the parts A, B, C, D and E, or partially cover an area of the front surface of the electronic device 100 with the parts A, B, C, D or E. For example, the front cover unit 210a may cover front surface of the electronic device 100 corresponding to the parts A, B and C with the part A, B and C, cover the front surface of the electronic device 100 corresponding to the part A and B with the parts A and B thereof, or cover the front surface of the electronic device 100 corresponding to the part A with the part A thereof.

Referring to FIG. 3A according to another embodiment, the front cover unit 210a has a first window 204a-1 and a second window 204a-2 on a left upper side and a right lower side thereof, and has five parts A, B, C, D and E divided thereon.

Referring to FIG. 3B, the front cover unit 210a has the window 205a at a center portion of a left side thereof, and has three parts A, B and C divided thereon.

Referring to FIG. 3C, the front cover unit 210a has a window 206a on an upper side thereof, and has six parts A, B, C, D, E and F divided thereon. Referring to FIG. 3D, the front cover unit 210a has a first window 207a-1, a second window 207a-2, and a third window 207a-3 on a left upper side, a center portion, and a right lower side thereof, and has five parts A, B, C, D and E divided thereon.

If the front cover unit 210a is configured as shown in FIG. 3A, the front cover unit 210a may entirely cover the front surface of the electronic device 100, and the part A, the part B, the part C, the part D and the part E may sequentially cover the front surface of the electronic device 100. For example, the front cover unit 210a may entirely cover the front surface with the parts A, B, C, D and E, or partially cover the front surface of the electronic device 100 corresponding to the parts A, B, C, and D with the parts A, B, C, and D. Furthermore, the front cover unit 210a may cover the front surface of the electronic device 100 corresponding to the parts A, B and C with the parts A, B and C, cover the front surface of the electronic device 100 corresponding to the parts A and B with the parts A and B, or cover the front surface of the electronic device 100 corresponding to part A with the part A.

If the front cover unit 210a is configured as shown in FIG. 3B, the front cover unit 210a may entirely cover the front surface of the electronic device 100, and the part A, the part B and the part C may sequentially cover the front surface of the electronic device 100. For example, the front cover unit 210a may entirely cover the front surface of the electronic device 100 with all the parts A, B and C, may cover the front surface of the electronic device 100 corresponding to the part A with the part A, or may cover the front surface of the electronic device 100 corresponding to the parts A and B with the parts A and B thereof.

If the front cover unit 210a is configured as shown in FIG. 3C, the front cover unit 210a may entirely cover the front surface of the electronic device 100 in a direction from an upper side to a lower side, and the part A, the part B, the part C, the part D, the part E and the part F may sequentially cover the front surface of the electronic device 100. For example, the front cover unit 210a may entirely cover the front surface of the electronic device 100 with the parts A, B, C, D and E, or partially cover the front surface of the electronic device 100 corresponding to the part A with the part A. Furthermore, the front cover unit 210a may cover the front surface of the electronic device 100 corresponding to the parts A and B with the parts A and B, cover the areas of the front surface of the electronic device 100 corresponding to the parts A, B, and C with parts A, B and C, cover the areas of the front surface of the electronic device 100 corresponding to the parts A, B, C and D with the parts A, B, C and D, or cover the front surface of the electronic device 100 corresponding to the parts A, B, C, D and E with the parts A, B, C, D and E thereof.

If the front cover unit 210a is configured as shown in FIG. 3D, further, the front cover unit 210a may cover the front surface of the electronic device 100 in such a manner as shown in FIGS. 2A, 2B, 2C and 2D.

Figure 4:
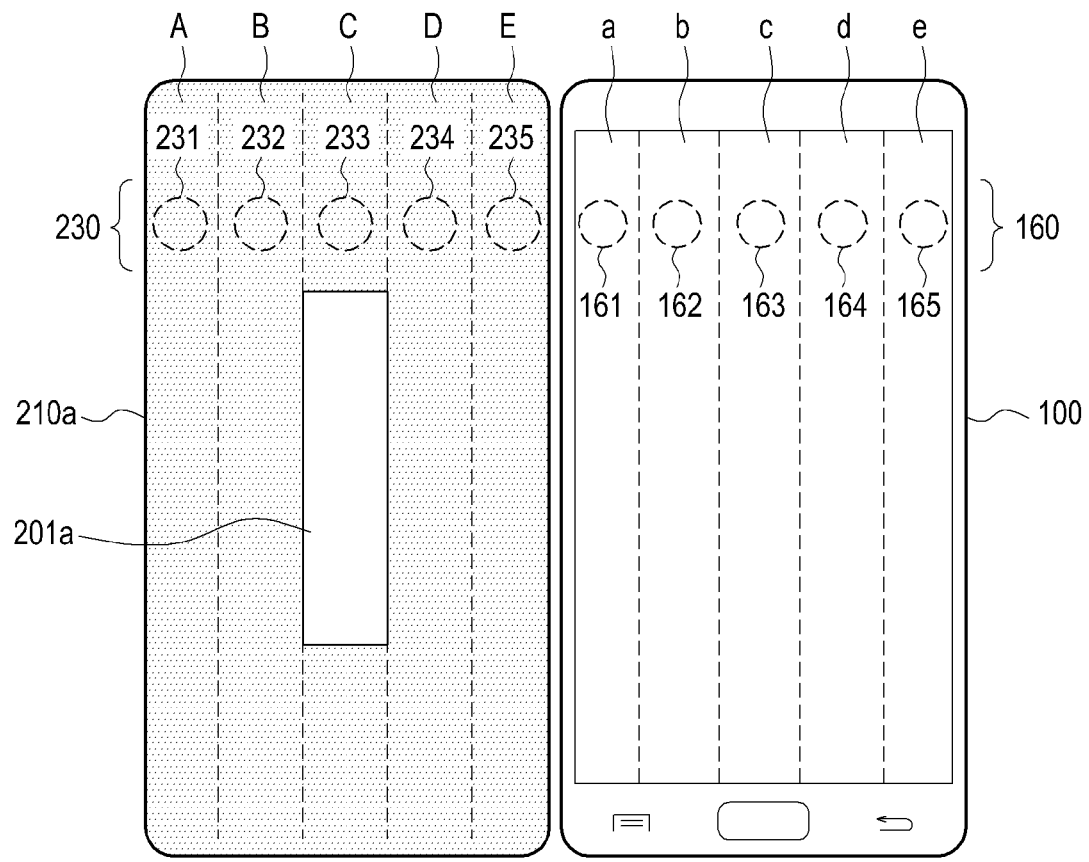
FIGS. 4 and 5 are views illustrating determining whether the electronic device is covered with the cover according to various embodiments of the present disclosure.
Figure 5:
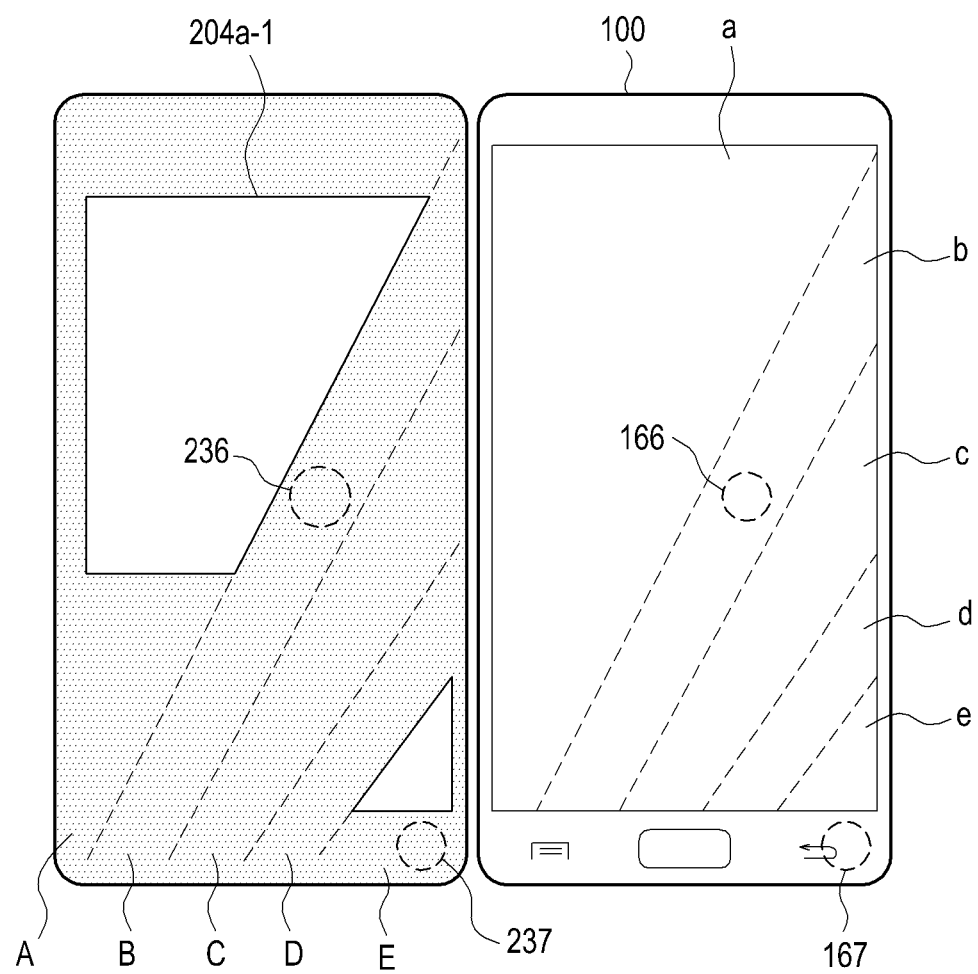

FIGS. 4 and 5 are views illustrating a determining whether the electronic device is covered with the cover according to various embodiments of the present disclosure.

Referring to FIG. 4, the cover 200 may have one or more magnetic force applying units 231, 232, 232, 234 and 235 corresponding to parts A, B, C, D and E, respectively, on an inner surface of the front cover unit 210a. The electronic device 100 may be provided with one or more magnetic force detecting sensors 161, 162, 163, 164 and 165 for detecting magnetic forces. When the front surface of the electronic device 100 is covered with one or more parts A, B, C, D and E, the one or more magnetic force detecting sensors 161, 162, 163, 164 and 165 may detect magnetic forces of the one or more magnetic force applying units 231, 232, 233, 234 and 235 arranged in one or more parts A, B, C, D and E respectively, and the electronic device 100 may determine which of parts A, B, C, D and E covers the front surface thereof according to the detection of the magnetic force detecting sensors 161, 162, 163, 164 and 165.

For example, in the case that the parts E and D of the front cover units 210a cover areas e and d of the front surface, the electronic device 100 may detect magnetic forces of the magnetic force applying units 234 and 235 through the magnetic force detecting sensors 161 and 162 and determine that the areas e and d are covered with the parts E and D of the front cover unit 210a.

According to the various embodiments of the present disclosure, on the other hand, the magnetic force applying units and the magnetic force detecting sensors may be provided in correspondence to the entire parts respectively, or may be provided in correspondence to predetermined parts.

Referring to FIG. 5, the cover 200 may be provided with magnetic force applying units 236 and 237 in parts B and E of the front cover unit 210a, and the electronic device 100 may be provided with magnetic force detecting sensors 166 and 167 for detecting magnetic forces of the magnetic force applying units 231, 232, 233, 234 and 235. When the electronic device 100 is covered with the parts B and E, the magnetic forces of the magnetic applying units 236 and 237 c may be detected by the magnetic force detecting sensors 166 and 167 respectively, and the electronic device 100 may determine whether the parts B and C of the front cover unit 210a are covered based on the result of the detection by each of the magnetic force detecting sensors 166 and 167.

The configuration of the cover 210a and the electronic device 100 will be described.

Figure 6:
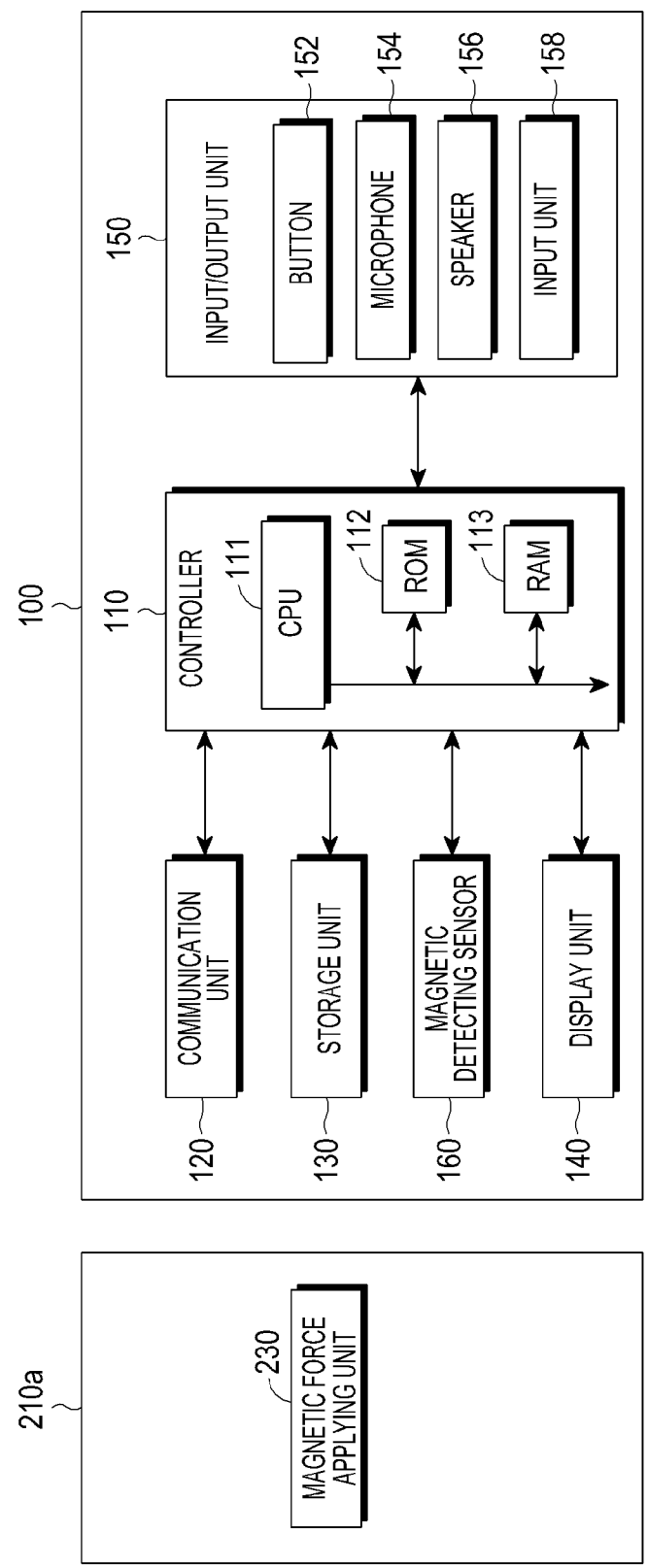
FIG. 6 is a block diagram illustrating the cover and the electronic device according to an embodiment of the present disclosure.

FIG. 6 is a block diagram illustrating the cover and the electronic device 100 according to an embodiment of the present disclosure.

Referring to FIG. 6, the cover 210a may include the magnetic force applying units 230. The magnetic force applying unit 230 may be arranged at positions corresponding to one or more parts of the cover 210a, respectively. According to another embodiment, the cover 210a may include touch protrusions (not shown) at positions corresponding to one or more parts instead of the magnetic force applying units 230. The touch protrusions may be made of a material such as a silicon material, capable of recognizing a touch input and touch the display unit 140 so as to input a touch when each of the one or more parts covers the display unit 140 of the electronic device 100.

The electronic device 100 may include the magnetic force detecting sensor 160 which detects the magnetic force applied by the magnetic force applying unit 230 as the display unit 140 is covered with each of one or more parts of the cover 210a, or the entire cover 210a. The magnetic force detecting sensor 160 may be arranged at a desired position in one or more areas corresponding to one or more parts on the display unit 140. The electronic device 100 may further include a controller 110, a communication unit 120, a storage unit 130, a display unit 140, and an input/output unit 150.

The controller 110 may include a Central Processor Unit (CPU) 111. The controller 110 may include a Digital Signal Processor (DSP) (not shown), and also may include a Read Only Memory (ROM) 112 storing a control program for controlling the electronic device 100 and a Random Access Memory (RAM) 113 used as a storage area for storing a signal or data input from the outside of the electronic device 100 or for work performed in the electronic device 100. The CPU may include a single core type CPU or a multi-core type CPU such as a dual core type CPU, a triple core type CPU, and a quad core type CPU. The CPU, the ROM and the RAM may be connected with one another through internal buses. Such a controller 110 may control the communication unit 120, the storage unit 130, the display unit 140, the input/output unit 150, and the magnetic force detecting sensor 160. For example, the controller 110 may perform a function of controlling overall operations of the electronic device 100, and control a signal flow between the structural elements.

The controller 110 may determine whether one or more parts of the cover 210a covers the display unit 140 based on the detection of the magnetic force by the magnetic force detection sensor 160 and may control to perform a corresponding function. Further, in the case that the one or more parts of the cover 210a cover the display unit 140, the controller 110 may determine whether the parts of the cover 210a cover the display unit 140 as the touch protrusions formed on the one or more parts touch the display screen to input a touch and may control to perform a corresponding function if each of the one or more parts cover the display screen.

For example, when at least one part among the parts of the cover 210a cover the display unit 140, the controller 110 may display predetermined information on a window area of the display screen corresponding to the window.

Further, when a user gesture is input in the display unit 140 corresponding to a part which does not cover the display unit 140, the controller 110 performs a predetermined function corresponding to the input of the user gesture.

Furthermore, if the part of the cover 210a covers the display screen and the part having no window does not cover the display screen during an execution of an application such as a quiz application, the controller 110 may control the display unit 140 to display first information related to an application on a window area of the display screen corresponding to the window, and to display second information related to an application on an area of the display screen corresponding to the part which does not cover the display screen.

In addition, when at least one part is made to be open when the parts of the cover 210a cover the display unit 140, the controller 110 may control the display unit 140 to display a recent application list on an area of the display screen corresponding to the open part.

Moreover, when all the parts are made to be open during a display of the recent application list, the controller 110 controls the display unit to display an execution screen of the recent application on the display screen.

Additionally, the controller 110 controls to display information in at least one window area on the display screen corresponding to at least one window of the cover 210a and to set a sort of information displayed in the at least one window area.

The communication unit 120 may connect the electronic device 100 to an external device (not shown) and communicate with the external device. The external device may include a different device (not shown), a portable phone (not shown), a smart phone (not shown), a tablet PC (not shown), and a server (not shown). The communication unit 120 may include various communication modules such as a mobile communication module, a Near Field Communication (NFC) module, a Bluetooth communication module, and the like, and may communicate with the external device by using various communication modules.

For example, the electronic device may transmit/receive a wireless signal for voice communication, video communication, a Short Message Service (SMS), or a Multimedia Message Service (MMS) to/from a portable phone (not shown), a smart phone (not shown), a tablet PC, or another device (not shown) which has a phone number input to the electronic device 100 through the mobile communication module. Further, the electronic device 100 may receive information through the NFC module from the external device or receive information through the Bluetooth communication module from the external device. According to the various embodiments of the present disclosure, the communication unit 120 may further include at least one of a wireless Local Area Network (LAN) module (not shown) and other short-range communication modules (not shown) as well as the NFC module and the Bluetooth module and may receive information through at least one of the wireless LAN module and the other short-range communication modules. The wireless LAN module may be connected to the Internet in a place where a wireless Access Point (AP, not illustrated) is located. The wireless LAN module may support the wireless LAN provision of the Institute of American Electrical and Electronics Engineers (IEEE) such as IEEE802.11ac. The other short range communication modules may wirelessly perform short range communication between the electronic device 100 and the external device under a control of the controller 110. The other short-range communication schemes may include an InfraRed Data Association (IrDA) scheme and the like.

The storage unit 130 may store signals or data input/output in correspondence to the operation of the controller 110, the communication unit 120, the display unit 140, and the input/output unit 150. The storage unit 130 may store programs and applications for controlling the electronic device 100 or the controller 110, and a program and data for executing various functions. The term "storage unit" refers to the ROM 112 in the controller 110, the RAM 113, or a memory card (not shown), i.e. a Secure Digital (SD) card and a memory stick inserted in the electronic device 100. The storage unit 130 may include a non-volatile memory, a volatile memory, a Hard Disk Drive (HDD) or a Solid State Drive (SSD). The storage unit 130 may be a machine-readable medium, e.g., computer-readable medium for providing data to the machine so that the machine performs a specific function. The machine-readable medium may be storage medium. The storage unit 130 may include a non-volatile medium and a volatile medium. All of these media should be a type that allows the commands transferred by the media to be detected by a physical instrument in which the machine reads the commands. The machine-readable medium may include, but is not limited thereto, and may include at least one of a floppy disk, a flexible disk, a hard disk, a magnetic tape, a Compact Disc-ROM (CD-ROM), an optical disk, a punch card, a paper tape, a RAM, a Programmable ROM (PROM), an Erasable PROM (EPROM), and a Flash EPROM.

The display unit 140 may be a touch screen and provide various graphical user interfaces to a user. For example, the display unit 140 may receive various gesture inputs including proximity, a touch and the like, through a user's body, e.g., fingers including a thumb, or a touchable input unit, e.g., a pen. The display unit 140 may be implemented in a resistive type display screen, a capacitive type display screen, an infrared type display screen, or an ultrasonic wave type display screen. As described above, according to the embodiment of the present disclosure, the display unit 140 may display a screen for an execution of an application, a screen for a messenger, a screen for a generation of a message, a screen for a reception of a message and the like. Further, the display unit 140 may display information in a predetermined area on the display screen if each of one or more parts of the cover 210*a* covers the display screen.

The input/output unit 150 may include a button 152, a microphone 154, a speaker 156, and an input unit 158. The input/output unit 150 is not limited to those described above, and may include a cursor controller such as a mouse, a trackball, a joystick, and cursor directional keys to control movement of a cursor on the screen 140 and the communication with the controller 110. One or more buttons 152 may be provided for the electronic device 100 and may provide various input signals to the controller 110 according to a pushing operation of the user. The microphone 154 is capable of receiving an input of voice or sound involved in various sound sources to generate electric signals. The speaker 156 may output sounds corresponding to various signals, e.g., a wireless signal, a broadcasting signal, a digital audio file, a digital video file, and the like according to the execution of the application. The input unit 158 may be inserted and stored in the electronic device 100 or may be a separately configured device or object. The input unit 158 may be an input means such as a stylus pen (hereinafter, referred to as a pen), or a user's finger, which is capable of performing an input such as proximity or a touch into the display unit 140.

According to the various embodiments of the present disclosure, the electronic device 100 may determine whether each of one or more parts of the cover 210*a* covers the display screen and performs a predetermined function if one or more parts of the cover 210*a* cover the display screen. According to the various embodiments of the present disclosure, the electronic device 100 may determine which part of one or more parts of the cover 210*a* covers the display screen and display information in an area of the display screen corresponding to the part covering the display screen.

Hereinafter, the various embodiments of the present disclosure will be described in detail.

Figure 7:
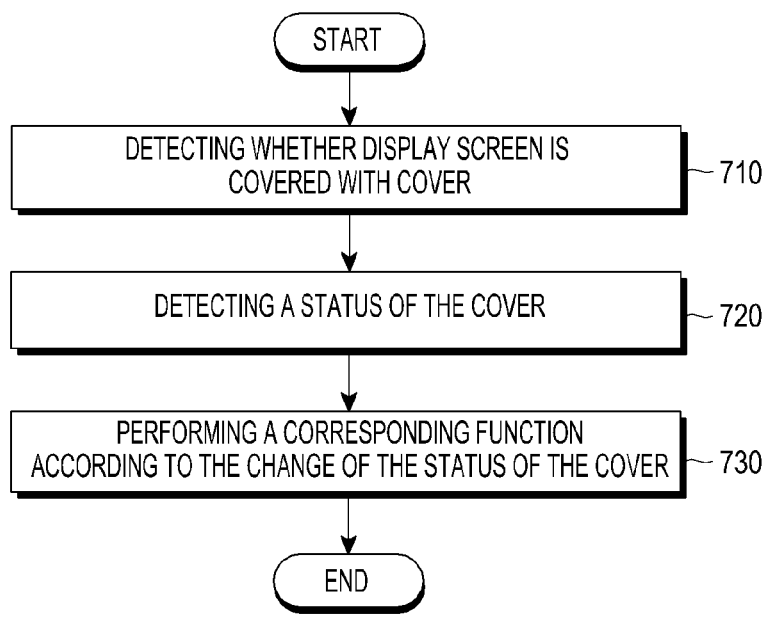
FIG. 7 is a flowchart illustrating an operation of an electronic device depending on a status of a cover which covers the electronic device or is open according to a first embodiment of the present disclosure.

FIG. 7 is a flowchart illustrating an operation of an electronic device depending on a status of a cover which covers the electronic device or is open according to a first embodiment of the present disclosure.

Referring to FIG. 7, the electronic device 100 may determine whether one or more parts of the cover 210*a* covers the display screen of the display unit 140 in operation 710. For example, the electronic device 100 may detect whether one or more parts of the cover 200*a* covers the display unit 140 via the magnetic force detecting sensor 160. In the case that one or more parts of the cover 210*a* cover the display unit 140, the electronic device 100 may detect that one or more parts of the cover 210*a* covers the display screen of the display unit 140 when a touch of the touch protrusion formed in each part is input.

The electronic device 100 may detect a status of the cover 210*a* in operation 720. For example, the electronic device 100 may detect a change of the status of the cover when one or more parts covered on the display screen become open, or when one or more open parts cover the display screen.

The electronic device 100 may perform a corresponding function according to the change of the status of the cover in operation 730. For example, the electronic device 100 may change an area of the display screen on which information is displayed or replace information displayed on the display screen when the status of the cover is changed. In addition, the electronic device 100 may control the display screen according to the change of the status of the cover.

According to the second embodiment of the present disclosure, the cover may have five parts A, B, C, D and E divided, any one part, e.g., the part C, of the five parts may be provided with the magnetic force applying unit or the touch protrusion, and the part C may have a first window through which a user can visually perceive the display screen of the display unit. The first window may be made of a transparent material, or be perforated in the form of an opening. For example, the first window may be a transparent window or an open cutout window. It is possible to visually perceive the display screen of the display unit arranged inside of the window through the first window.

Figure 8:
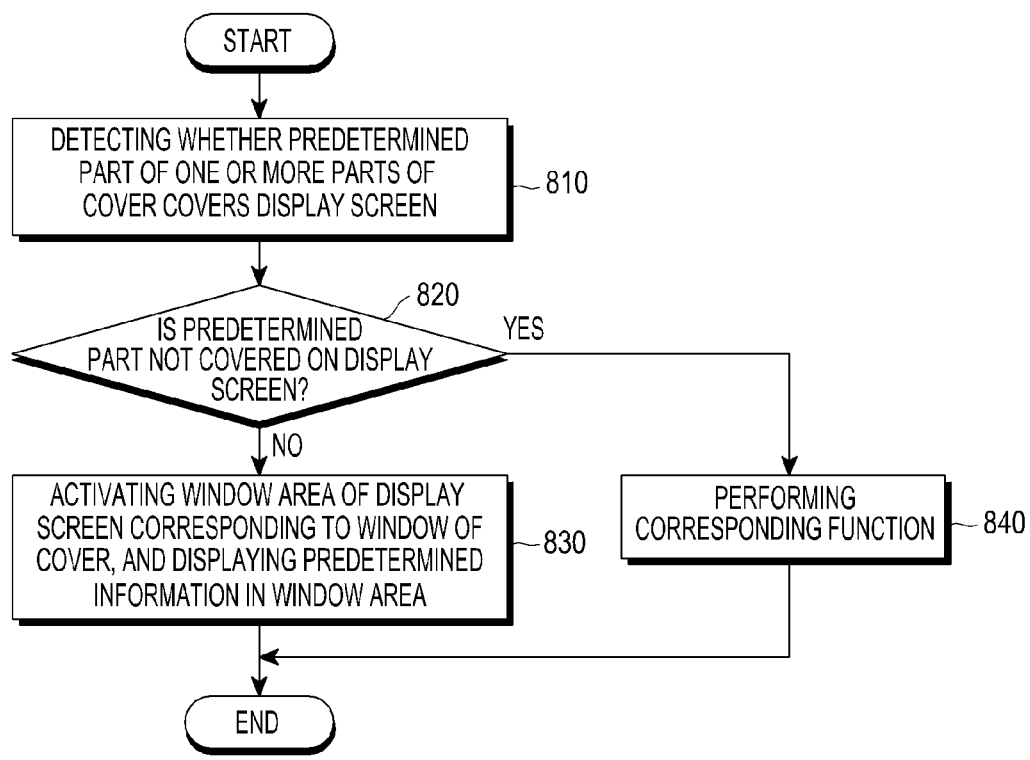
FIG. 8 is a flowchart illustrating an operation of an electronic device depending on a status of a cover which covers the electronic device or is open according to a second embodiment of the present disclosure.

FIG. 8 is a flowchart illustrating an operation of the electronic device depending on the status of the cover which covers the electronic device or is open according to the second embodiment of the present disclosure.

Figure 9:
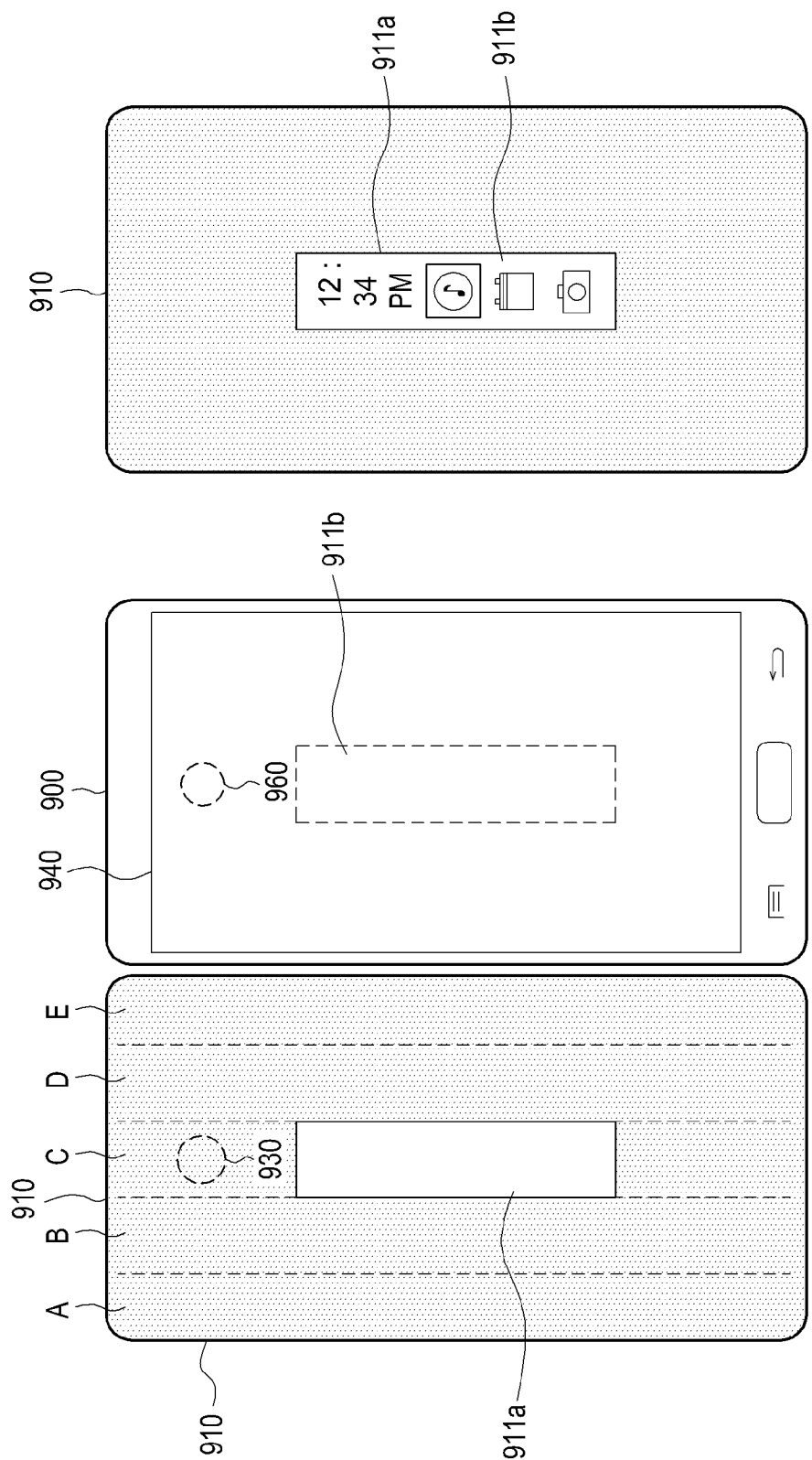
FIGS. 9A and 9B are views illustrating a display of the electronic device depending on the status of the cover which covers the electronic device or is open according to the second embodiment of the present disclosure.

FIGS. 9A and 9B are views illustrating a display of the electronic device depending on the status of the cover which covers the electronic device or is open according to the second embodiment of the present disclosure.

Referring to FIGS. 8, 9A, and 9B, the electronic device 900 may detect whether a predetermined part of the one or more parts of the cover covers the display screen in operation 810. As shown in FIG. 9A, for example, the electronic device 900 may detect whether the part C having the first window 911*a* among the one or more parts A, B, C, D and E of the cover 910 covers the display screen of the electronic device 900. At this time, the electronic device 900 may detect the magnetic force through the magnetic force detecting sensor 960 or the touch input through the display unit 940 when the magnetic force applying unit 930 arranged in the part C applies the magnetic force or the touch protrusion formed in the part C touches the display screen of the display unit 940. The electronic device 900 may determine whether the part C covers the display screen of the display unit 940 as the magnetic force detecting sensor 960 detects the magnetic force or the display unit 940 detects the touch input.

The electronic device 900 may determine whether a predetermined part covers the display screen of the display unit 940 in operation 820. For example, the electronic device 900 may determine whether the part C including the first window 911*a* covers the display screen of the display unit 940.

If the predetermined part does not cover the display screen of the display unit 940, the electronic device 900 may recognize that the display screen is open and may perform a corresponding function of activating an entire display screen or unlocking the entire display screen in operation 840.

If the predetermined part does not cover the display screen of the display unit 940, the electronic device 900 may activate a first window area 911*b* of the displays screen corresponding to the first window 911*a* and display predetermined information in operation 830. As shown in FIG. 9B, for example, if the part C covers the display screen of the display unit 940, the electronic device 900 may activate the first window area 911*b* of the display screen corresponding to the first window 911*a* and display information such as time or an executable application in the first window area 911*b*. In addition, brief contents such as contents of a received message, a phone number according to a voice call, a user environment set by a user, and the like may be displayed.

According to the third embodiment of the present disclosure, the cover may have five parts A, B, C, D and E, three parts, e.g., the parts A, B and C, of the five parts may be provided with the magnetic force applying unit or the touch protrusion and the part C may have a first window through which a user can visually perceive the display unit. The first window may be made of a transparent material, or be perforated in the form of an opening. For example, the first window may be a transparent window or an open cutout window. It is possible to visually perceive the display screen of the display unit arranged inside of the window through the first window.

Figure 10:
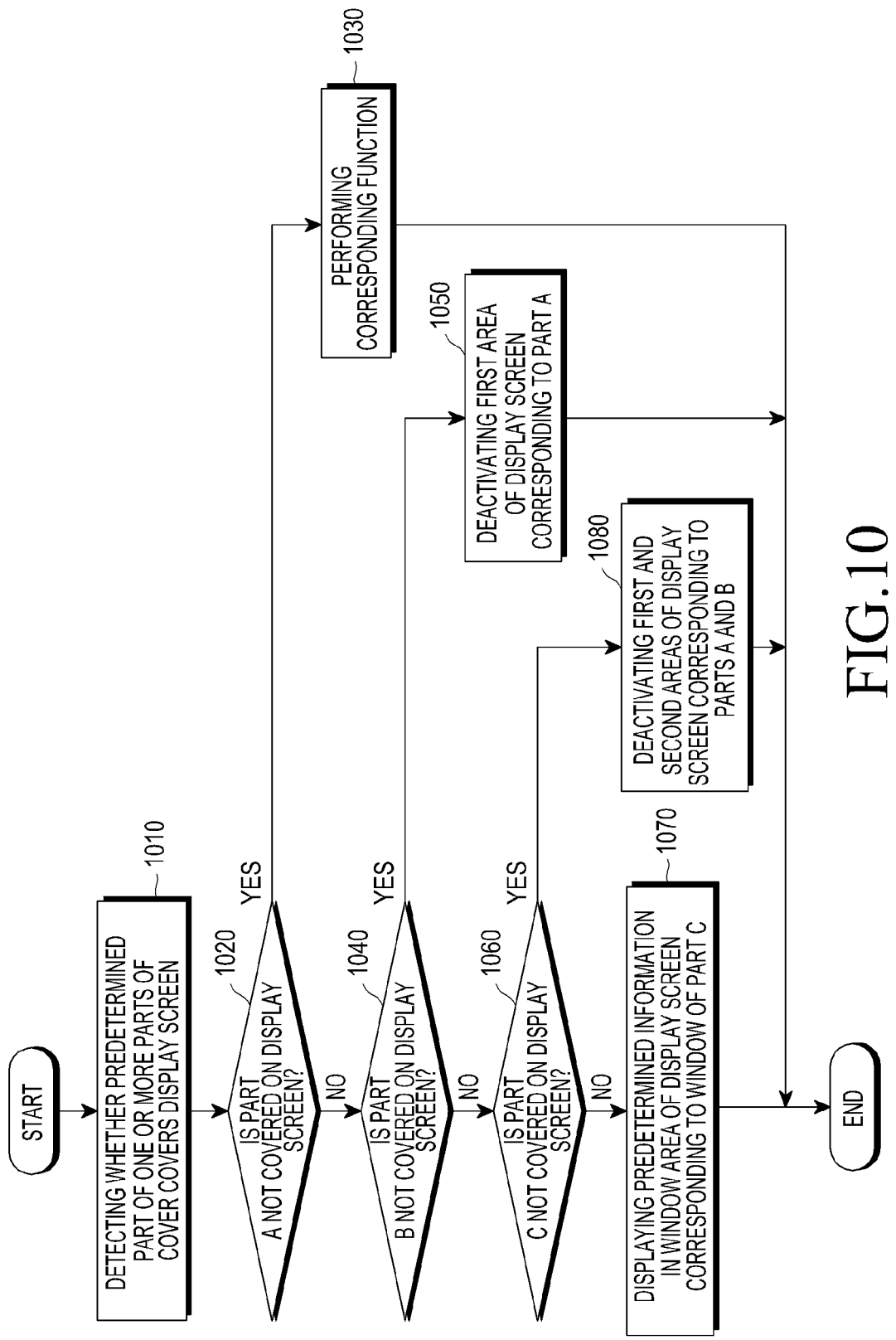
FIG. 10 is a flowchart illustrating an operation of an electronic device depending on a status of a cover which covers the electronic device or is open according to a third embodiment of the present disclosure.

FIG. 10 is a flowchart illustrating an operation of the electronic device depending on the status of the cover which covers the electronic device or is open according to the third embodiment of the present disclosure.

Figure 11:
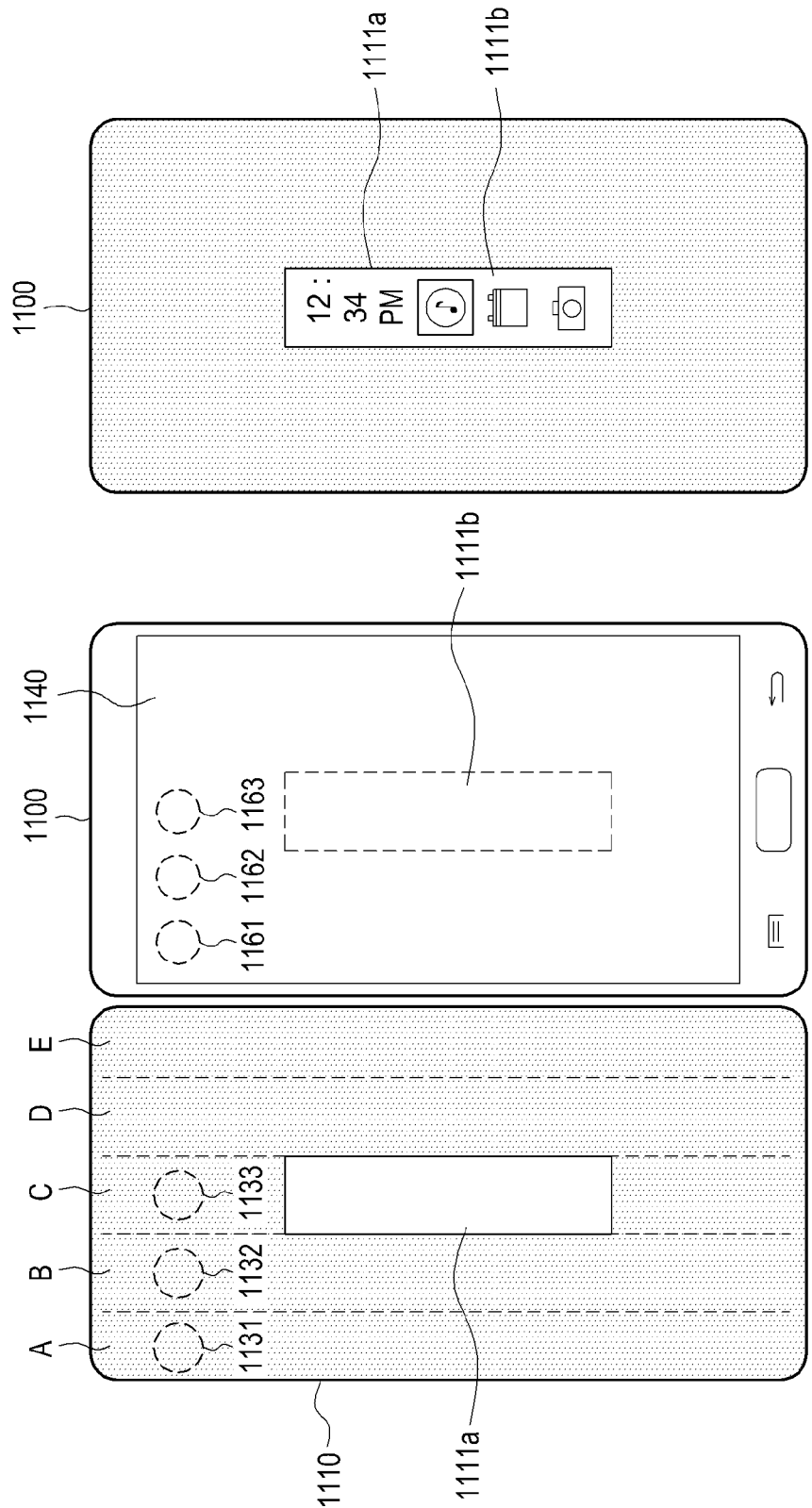
FIGS. 11A and 11B are views illustrating a display of the electronic device depending on the status of the cover which covers the electronic device or is open according to the third embodiment of the present disclosure.

FIGS. 11A and 11B are views illustrating a display of the electronic device depending on the status of the cover which covers the electronic device or is open according to the third embodiment of the present disclosure.

Referring to FIGS. 10, 11A and 11B, the electronic device 1100 may detect whether a predetermined part of the one or more parts of the cover covers the display screen in operation 1010. As shown in FIG. 11A, for example, the electronic device 1100 may detect whether three parts A, B and C of the cover 1110 cover the display screen of the electronic device 1100. At this time, the electronic device 1100 may detect the magnetic forces through the magnetic force detecting sensors 1161, 1162 and 1163 or the touch inputs through the display unit 1140 when the magnetic force applying units 1131, 1132 and 1133 arranged in the parts A, B and C apply the magnetic forces. The electronic device 1100 may determine whether the parts A, B and C cover the display screen of the display unit 1140 as the magnetic force detecting sensors 1161, 1162 and 1163 detect the magnetic forces or the display unit 1140 detects the touch inputs via the magnetic force applying units 1131, 1132 and 1133.

The electronic device 1100 may determine whether the part A does not cover the display screen of the display unit 1140 in operation 1020. If the part A does not cover the display screen of the display unit 1140, the electronic device 1100 may recognize that the display screen is open and perform a corresponding function of activating an unlocked screen or the entire display screen in order to release a lock of the display screen in operation 1030.

If the part A covers the display screen of the display unit 1140, the electronic device 1100 may determine whether the part B does not cover the display screen of the display unit 1140 in operation 1040. If the part B does not cover the display screen of the display unit 1140, the electronic device 1100 may determine that only the first area of the display screen corresponding to the part A is covered with the part A and deactivate the first area of the display screen corresponding to the part A.

If the part B covers the display screen of the display unit 1140, the electronic device 1100 may determine whether the part C does not cover the display screen of the display unit 1140 in operation 1060. If the part C does not cover the display screen of the display unit 1140, the electronic device 1100 may determine that the first and second areas of the display screen corresponding to the parts A and B are covered with the parts A and B respectively and deactivate the first and second areas of the display screen corresponding to the parts A and B in operation 1080.

If the part C covers the display screen of the display unit 1140, the electronic device 1100 may determine that the third area of the display screen corresponding to the part C is covered and display predetermined information in a window area 1111b corresponding to the window 1111a. For example, the electronic device 1100 may activate the window area 1111b of the display screen corresponding to the window 1111a of the cover 1110 and display information such as time or an executable application. In addition, brief contents such as contents of a received message, a phone number according to a voice call, a user environment set by a user, and the like may be displayed.

According to the fourth embodiment of the present disclosure, on the other hand, the cover may have five parts A, B, C, D and E divided thereon, two parts, e.g., the parts B and C, of the five parts may be provided with the magnetic force applying units or the touch protrusions respectively, and the parts B and C may have first and second windows respectively, through which a user can visually perceive the display unit. The first and second windows may be made of a transparent material or be perforated in the form of an opening. For example, the first and second windows may be transparent windows or open cutout windows. It is possible to visually identify the display screen of the display unit arranged inside of the cover through the first and second. The first and second windows may be one window which is made of an identical material or may be perforated in the form of a single opening.

Figure 12:
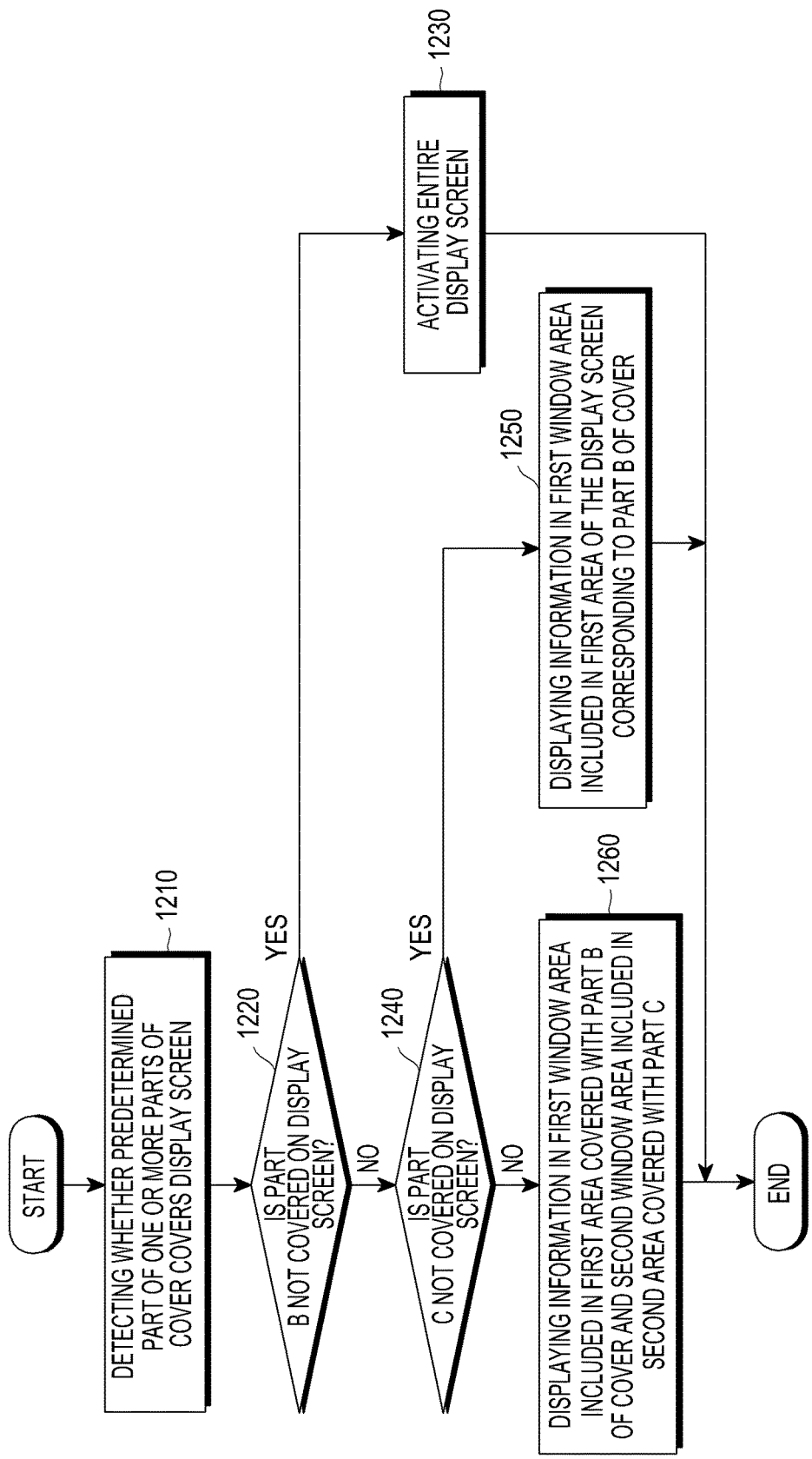
FIG. 12 is a flowchart illustrating an operation of an electronic device depending on a status of a cover which covers the electronic device or is open according to a fourth embodiment of the present disclosure.

FIG. 12 is a flowchart illustrating an operation of the electronic device depending on the status of the cover which covers the electronic device or is open according to the fourth embodiment of the present disclosure.

FIGS. 13A, 13B, 13C and 13D are views illustrating a display of the electronic device depending on the status of the cover which covers the electronic device or is open according to the fourth embodiment of the present disclosure.

Figure 13:
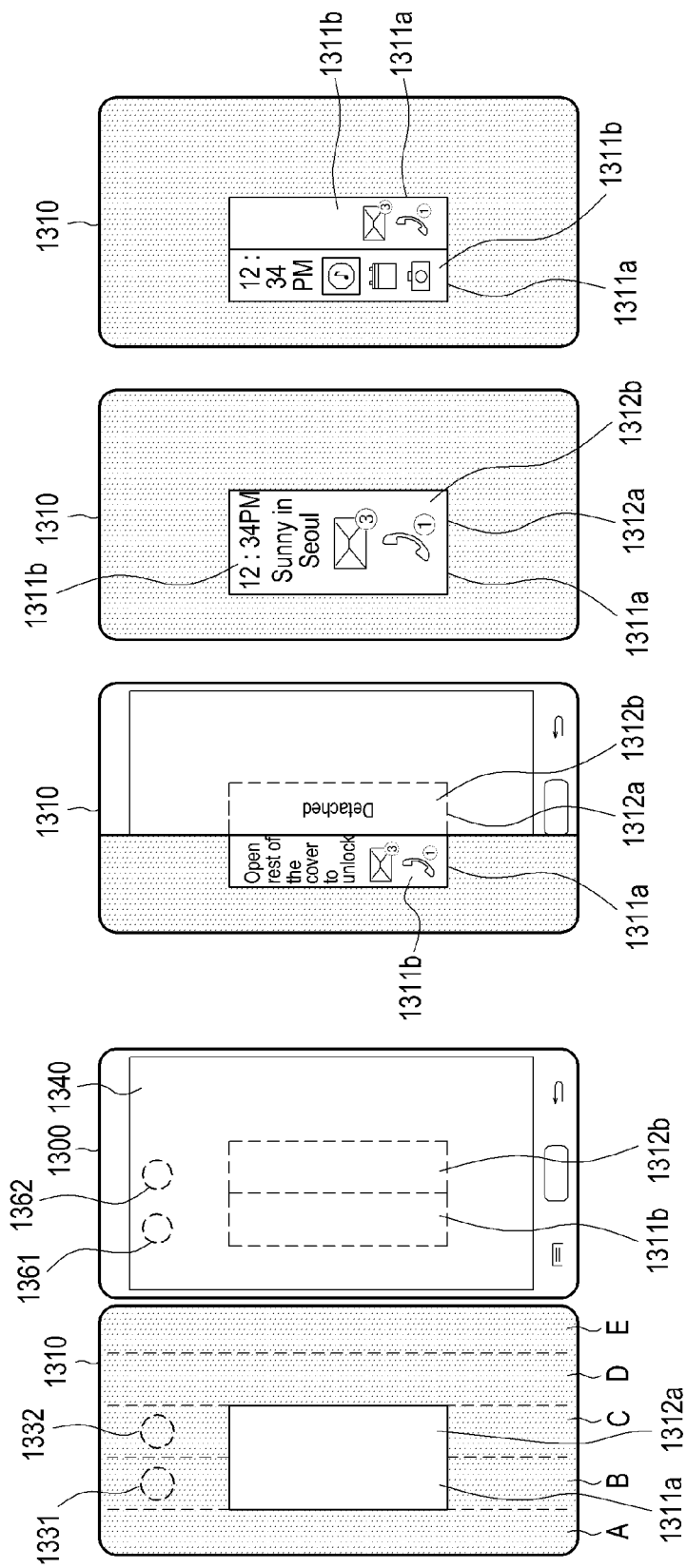
FIGS. 13A, 13B, 13C and 13D are views illustrating a display of the electronic device depending on the status of the cover which covers the electronic device or is open according to the fourth embodiment of the present disclosure.

Referring to FIGS. 12, 13A, 13B, 13C and 13D, the electronic device 1300 may detect whether a predetermined part of the one or more parts of the cover 1310 covers the display screen in operation 1210. As shown in FIG. 13A, for example, the electronic device 1300 may detect whether two parts B and C of the cover 1310 cover the display screen 1340 of the electronic device 1300. At this time, the electronic device 1300 may detect the magnetic forces through the magnetic force detecting sensors 1361 and 1362 or the touch inputs through the display unit 1340. The electronic device 1300 may determine whether the parts B and C cover corresponding areas of the display screen of the display unit 1340 if the magnetic force detecting sensors 1361 and 1362 detect the magnetic forces or if the display unit 1340 detects the touch inputs.

The electronic device 1300 may determine whether the part B does not cover the display screen of the display unit 1340 in operation 1220. If the part B does not cover the display screen of the display unit 1340, the electronic device 1300 may perform a corresponding function of releasing a lock of the display screen or activating the entire display screen in operation 1230.

If the part B covers the display screen of the display unit 1340, the electronic device 1300 may determine whether the part C does not cover the display unit 1340 in operation 1240. If the part C does not cover the display screen of the display unit 1340, the electronic device 1300 may determine that the first area of the display screen corresponding to the part B is covered with the part B and display information in the first window area 1311b of the first area on the display screen. As shown in FIG. 13B, for example, the electronic device 1300 may combine two pieces of information displayed in the first window area 1311b and the second window area 1312b and display the combined information in the first window area 1311b of the first area on the display screen.

If the part C covers the display screen of the display unit 1340, the electronic device 1300 may display information in the first window area 1311*b* and the second window area 1312*b* in operation 1260.

As shown in FIG. 13C, for example, the electronic device 1300 may display information in the first window area 1311*b* and the second window area 1312*b*, respectively. As shown in FIG. 13D, alternatively, information may be combined and displayed in the first window area 1311*b* and the second window area 1312*b*. Alternatively, the electronic device 1300 may use any one of the first and second window areas 1311*b* and 1312*b* as an interaction area, and the other one of the first and second window areas 1311*b* and 1312*b* as an information display area.

According to the fifth embodiment of the present disclosure, on the other hand, the cover may have five parts A, B, C, D and E divided thereon, two parts, e.g., the parts B and D, of the five parts may be provided with the magnetic force applying units or the touch protrusions respectively, and the parts B and C may have first and second windows respectively, through which a user can visually perceive the display screen of the display unit. The first and second windows may be made of a transparent material or be perforated in the form of an opening. For example, the first and second windows may be transparent windows or open cutout windows. It is possible to visually perceive the display screen of the display unit arranged inside of the cover through the first and second windows from the outside.

Figure 14:
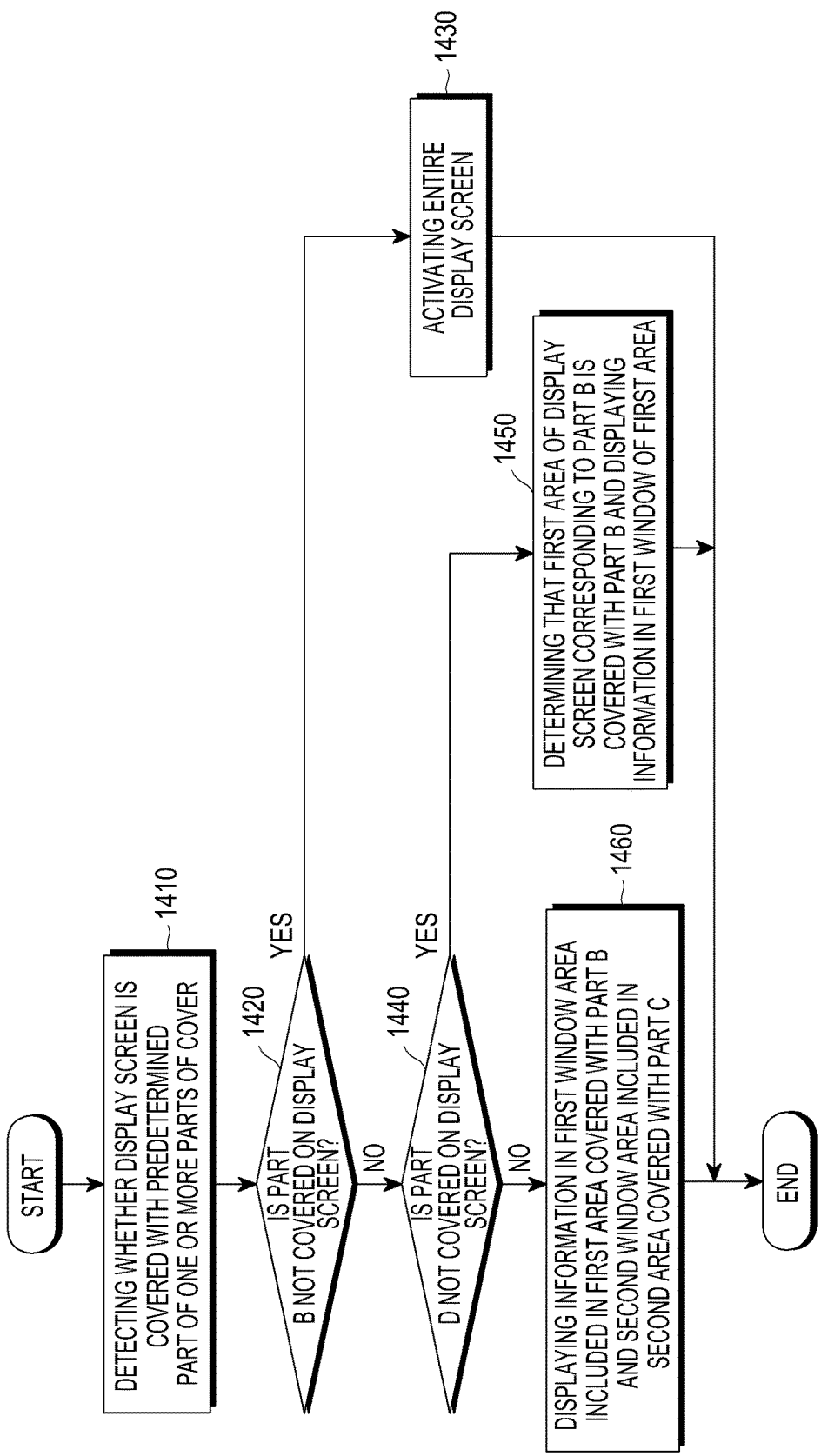
FIG. 14 is a flowchart illustrating an operation of an electronic device depending on a status of a cover which covers the electronic device or is open according to a fifth embodiment of the present disclosure.

FIG. 14 is a flowchart illustrating an operation of the electronic device depending on the status of the cover which covers the electronic device or is open according to the fifth embodiment of the present disclosure.

Figure 15:
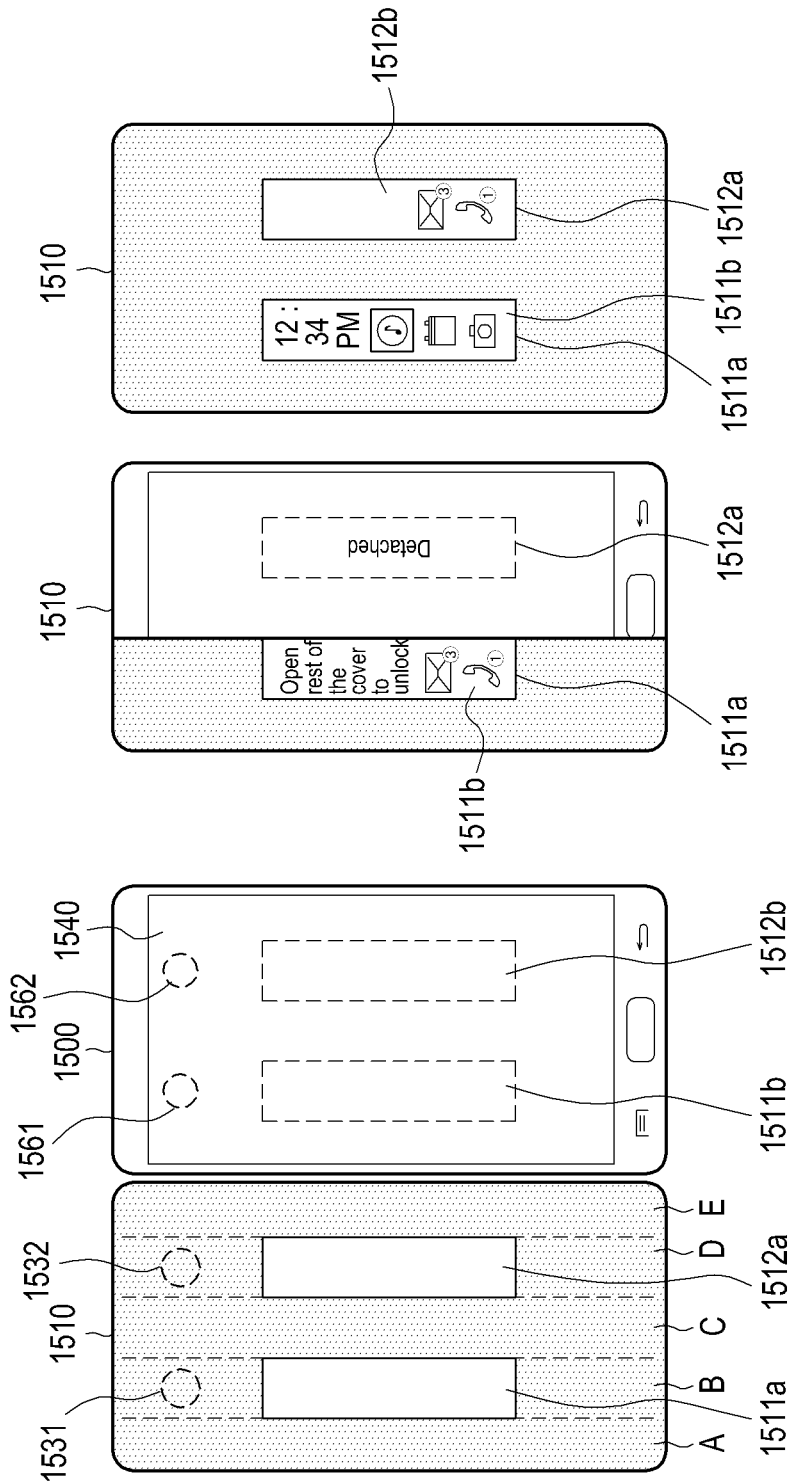
FIGS. 15A, 15B, and 15C are views illustrating a display of the electronic device depending on the status of the cover which covers the electronic device or is open according to the fifth embodiment of the present disclosure.

FIGS. 15A, 15B, and 15C are views illustrating a display of the electronic device depending on the status of the cover which covers the electronic device or is open according to the fifth embodiment of the present disclosure.

Referring to FIGS. 14, 15A, 15B, and 15C, the electronic device 1500 may detect whether a predetermined part of the one or more parts of the cover 1510 covers the display screen in operation 1410. As shown in FIG. 15A, for example, the electronic device 1500 may detect whether two parts B and D of the cover 1510 cover the display screen 1540 of the electronic device 1500. At this time, the electronic device 1500 may detect the magnetic forces through the magnetic force detecting sensors 1561 and 1562 or the touch inputs through the display unit 1540. The electronic device 1500 may determine whether the parts B and D cover corresponding areas of the display screen of the display unit 1540 as the magnetic force detecting sensors 1561 and 1562 detect the magnetic forces, or the display unit 1540 detects the touch inputs.

The electronic device 1500 may determine whether the part B does not cover the display screen of the display unit 1540 in operation 1420. If the part B does not cover the display screen of the display unit 1540, the electronic device 1500 may perform a corresponding function of releasing a lock of the display screen or activating the entire display screen in operation 1430.

If the part B covers the display screen of the display unit 1540, the electronic device 1500 may determine whether the part D does not cover the display screen of the display unit 1540 in operation 1440. If the part D does not cover the display screen of the display unit 1540, the electronic device 1500 may determine that only the first area of the display screen corresponding to the part B is covered with the part B and display information in the first window area 1511*b* of the first area on the display screen. As shown in FIG. 15B, for example, the electronic device 1300 may combine two pieces of information displayed in the first window area 1511*b* and the second window area 1512*b* and display the combined information in the first window area 1511*b*. Alternatively, the electronic device 1300 may display predetermined information in the first window area 1511*b*.

If the part D covers the display screen of the display unit 1540, the electronic device 1500 may display information in the first window area 1511*b* and the second window area 1512*b* in operation 1460.

As shown in FIG. 15C, for example, the electronic device 1500 may display information in the first window area 1511*b* and the second window area 1512*b*, respectively. Alternatively, the electronic device 1500 may use any one of the first and second window areas 1511*b* and 1512*b* as an interaction area, and the other one of the first and second window areas 1511*b* and 1512*b* as an information display area.

According to the sixth embodiment of the present disclosure, on the other hand, the cover may have five parts A, B, C, D and E divided thereon, two parts, e.g., the parts A and E, of the five parts may be provided with the magnetic force applying units or the touch protrusions respectively, and the parts A and E may have first and second windows respectively through which a user can visually perceive the display unit. The first and second windows may be made of a transparent material or be perforated in the form of an opening. For example, the first and second windows may be transparent windows or open cutout windows. It is possible to visually perceive the display screen of the display unit arranged inside of the cover through the first and second windows from the outside.

Figure 16:
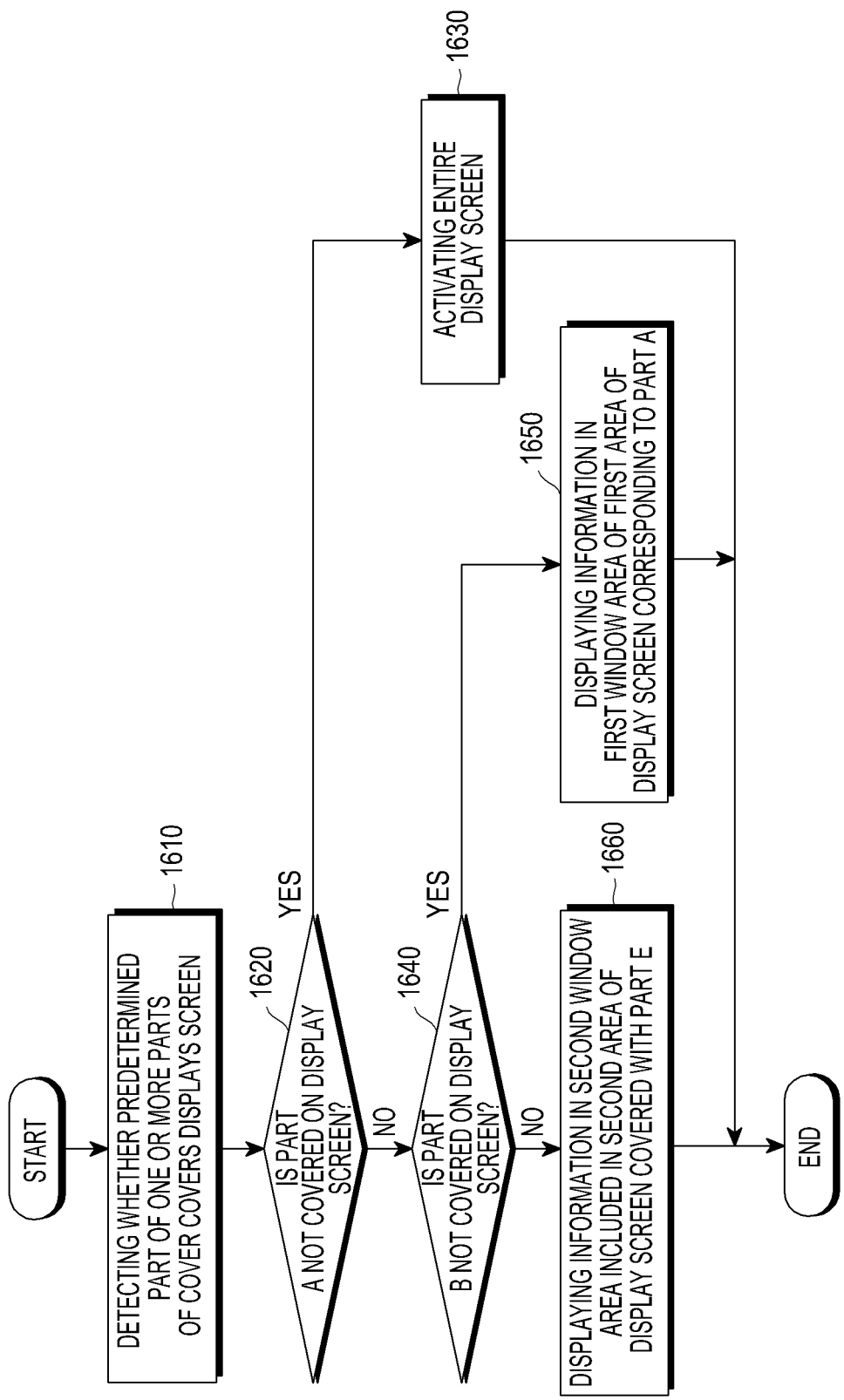
FIG. 16 is a flowchart illustrating an operation of an electronic device depending on a status of a cover which covers the electronic device or is open according to a sixth embodiment of the present disclosure.

FIG. 16 is a flowchart illustrating an operation of the electronic device depending on the status of the cover which covers the electronic device or is open according to the sixth embodiment of the present disclosure.

Figure 17:
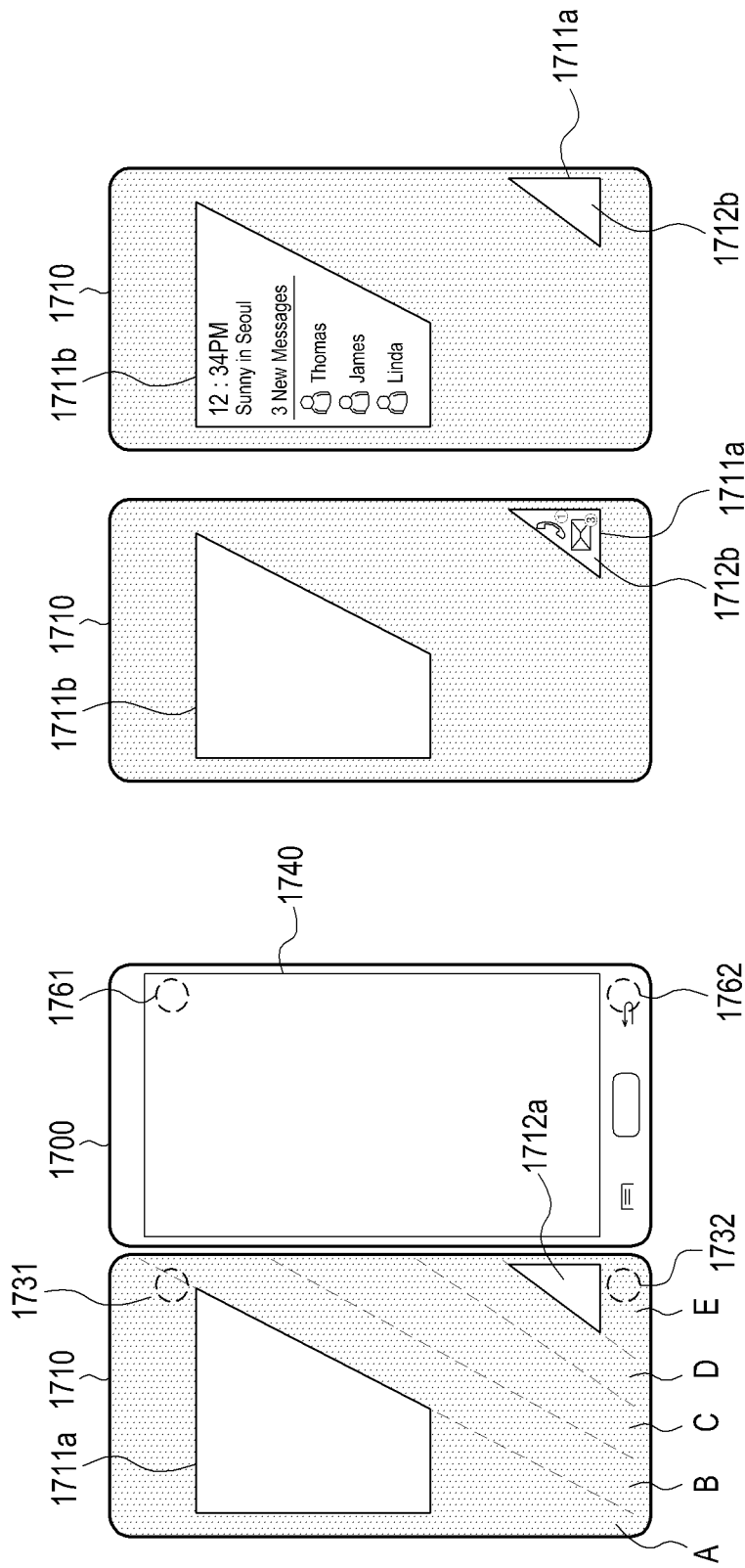
FIGS. 17A, 17B, and 17C are views illustrating a display of the electronic device depending on the status of the cover which covers the electronic device or is open according to the sixth embodiment of the present disclosure.

FIGS. 17A, 17B, and 17C are views illustrating a display of the electronic device depending on the status of the cover which covers the electronic device or is open according to the sixth embodiment of the present disclosure.

Referring to FIGS. 16, 17A, 17B, and 17C, the electronic device 1700 may detect whether a predetermined part of the cover 1710 covers the display screen in operation 1610. As shown in FIG. 17A, for example, the electronic device 1700 may detect whether two parts A and E of the cover 1710 covers the display screen 1740 of the electronic device 1700. At this time, the electronic device 1700 may detect the magnetic forces through the magnetic force detecting sensors 1761 and 1762 or the touch inputs through the display unit 1740. The electronic device 1700 may determine whether the parts A and E cover corresponding areas of the display screen of the display unit 1740 as the magnetic force detecting sensors 1761 and 1762 detect the magnetic forces, or the display unit 1740 detects the touch inputs.

The electronic device 1700 may determine whether the part A does not cover the display screen of the display unit 1700 in operation 1620. If the part A does not cover the display screen of the display unit 1740, the electronic device 1700 may perform a corresponding function of releasing a lock of the display screen or activating the entire display screen in operation 1630.

If the part A covers the display screen of the display unit 1740, the electronic device 1700 may determine whether the part E does not cover the display screen of the display unit 1740 in operation 1640. If the part E does not cover the display screen of the display unit 1540, the electronic device 1500 may display information in the first window area

1711*b* of the first area on the display screen corresponding to the part A in operation 1650. As shown in FIG. 17B, for example, the electronic device 1700 may display brief information corresponding to the second window area 1712*b* in the first window area 1711*b* on the display screen.

If part E covers the display screen of the display unit 1740, the electronic device 1700 may display information in the second window area 1712*b* in operation 1660. As shown in FIG. 17C, for example, the electronic device 1700 may display brief information corresponding to the first window area 1711*b* in the second window area 1712*b*.

According to the seventh embodiment of the present disclosure, on the other hand, the cover may have five parts A, B, C, D and E divided thereon, two parts, e.g., the parts A and E, of the five parts may be provided with the magnetic force applying units or the touch protrusions and the electronic device may perform a corresponding function as a gesture is input in any part of the cover not covering a display screen.

Figure 18:
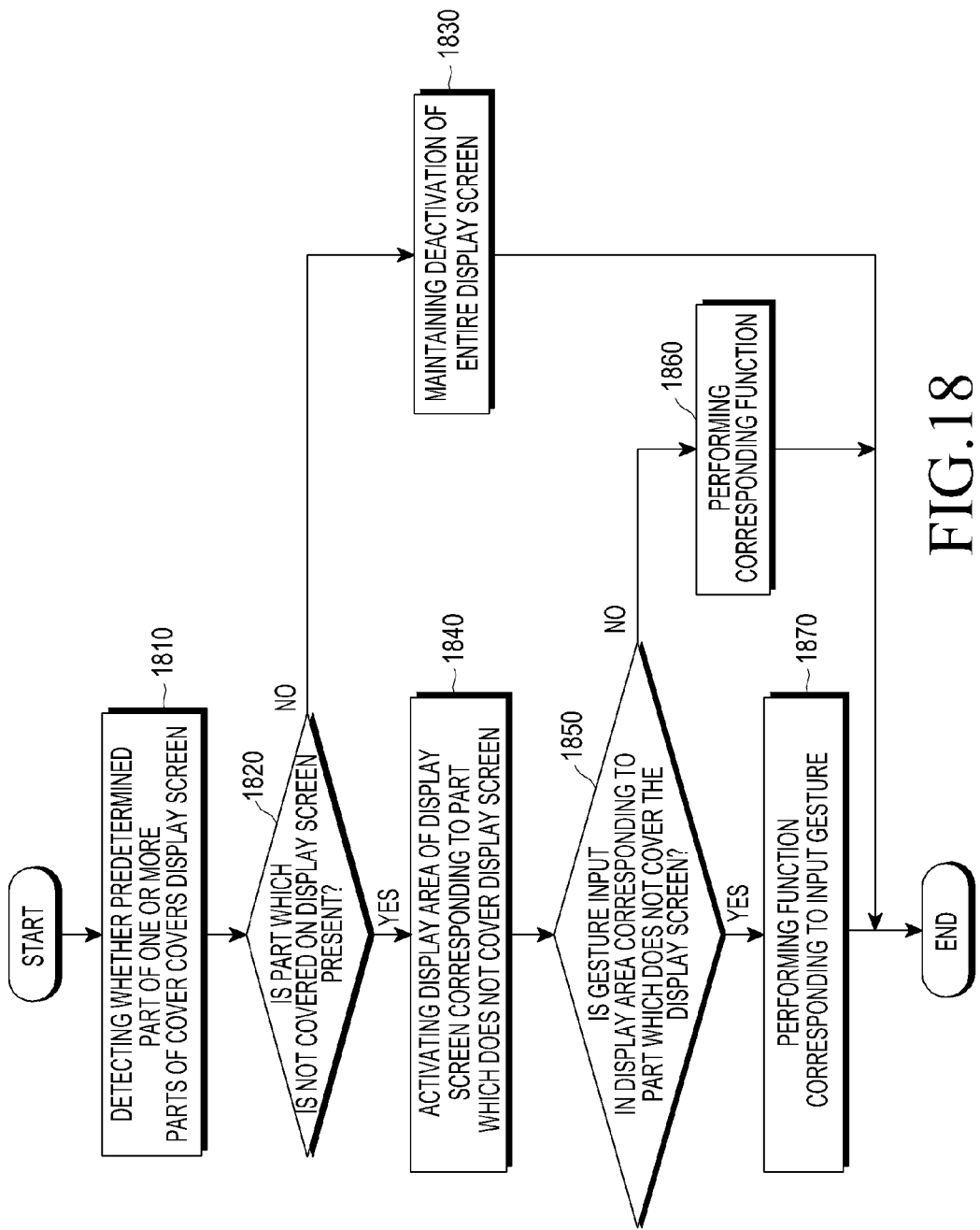
FIG. 18 is a flowchart illustrating an operation of an electronic device depending on a status of a cover which covers the electronic device or is open according to a seventh embodiment of the present disclosure.

FIG. 18 is a flowchart illustrating an operation of the electronic device depending on the status of the cover which covers the electronic device or is open according to the seventh embodiment of the present disclosure.

FIGS. 19A, 19B, 19C, and 19D are views illustrating a display of the electronic device depending on the status of the cover which covers the electronic device or is open according to the seventh embodiment of the present disclosure.

Figure 19:
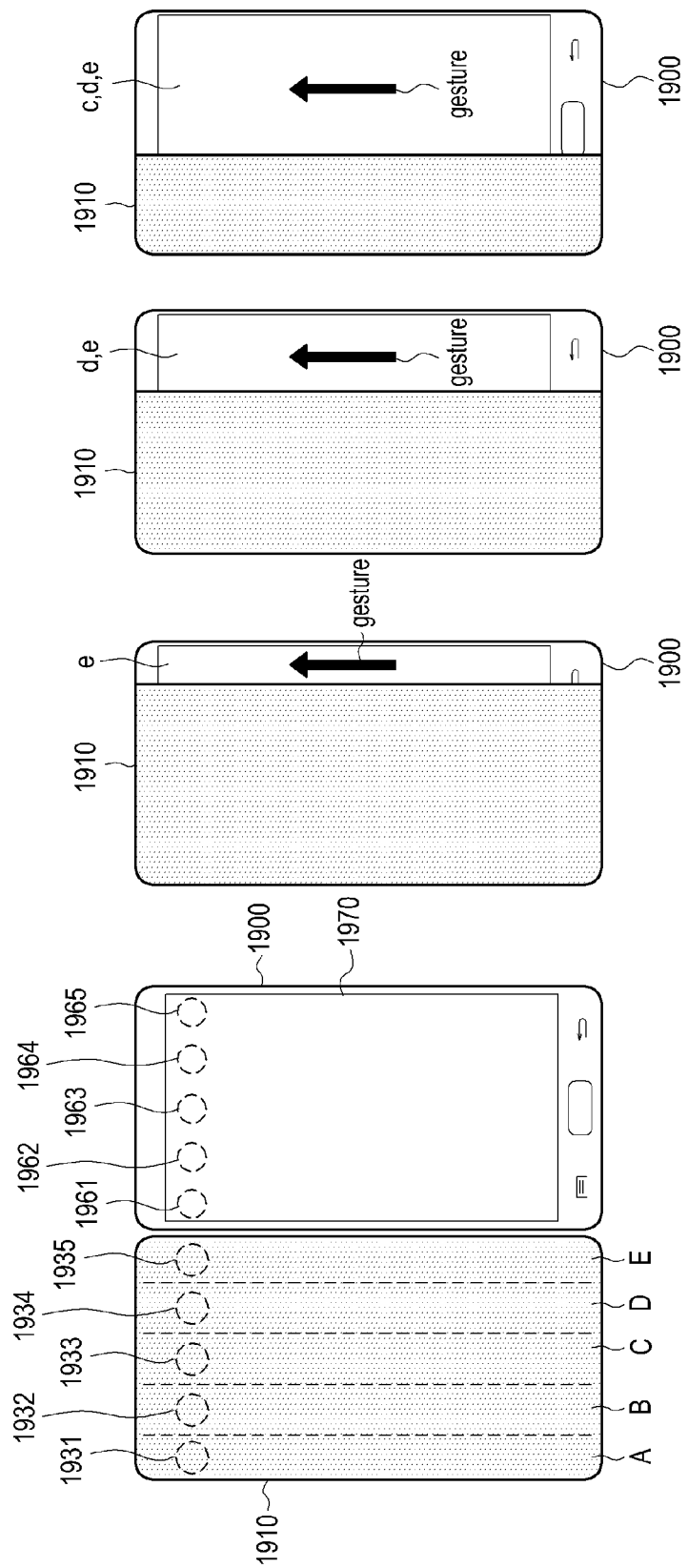
FIGS. 19A, 19B, 19C, and 19D are views illustrating a display of the electronic device depending on the status of the cover which covers the electronic device or is open according to the seventh embodiment of the present disclosure.

Referring to FIGS. 18, 19A, 19B, 19C, and 19D, the electronic device 1900 may detect whether a predetermined part of the cover 1910 covers the display screen in operation 1810. As shown in FIG. 19A, for example, the electronic device 1900 may detect whether each of one or more parts A, B, C, D and E of the cover 1910 cover the display screen of the electronic device 1900. At this time, the electronic device 1900 may detect the magnetic forces through the magnetic force detecting sensors 1961 and 1965 or the touch inputs through the display unit 1940. The electronic device 1900 may determine which area of the display unit 1970 each part covers as the magnetic force detecting sensors 1961, 1962, 1963, 1964 and 1965 detect the magnetic forces, or the display unit 1940 detects the touch inputs.

The electronic device 1900 may determine a presence or an absence of a part which does not cover the display screen in operation 1820. If the part which does not cover the display screen is absent, the electronic device 1900 may maintain a deactivation status of the entire display screen because the display screen 1970 of the electronic device 1900 is entirely covered.

If the part does not cover the display screen, the electronic device 1900 may activate an area of the display screen corresponding to the part which does not cover the display screen in operation 1840. As shown in FIG. 19B, for example, the electronic device 1900 may activate an area e of the display screen if the part E does not cover the display screen. As shown in FIG. 19C, for example, the electronic device 1900 may activate areas d and e of the display screen if the parts D and E do not cover the display screen. As shown in FIG. 19C, for example, the electronic device 1900 may activate areas c, d and e of the display screen if the parts C, D and E do not cover the display screen. When the display screen is activated, the electronic device may detect a user's gesture.

The electronic device 1900 may determine whether a gesture is input in an area of the display screen which is not covered in operation 1850. As shown in FIG. 19B, for example, the electronic device 1900 may detect an input of a user's gesture in an area e of the display screen. As shown in FIG. 19C, further, the electronic device 1900 may detect an input of a user's gesture in areas d and e. As shown in FIG. 19D, the electronic device 1900 may detect an input of a user's gesture in areas c, d and e.

If the gesture is input in an area of the display screen which is covered, the electronic device 1900 may perform a corresponding function in operation 1860. If the gesture is input in an area of the display screen which is not covered with any part, the electronic device 1900 may execute a function or an application corresponding to the input gesture in operation 1870. For example, the gesture may include various gestures such as a touch, a touch and hold, a swipe and the like. For example, the application may include various applications such as a camera application, a web application, a music reproducing application, and the like.

According to the eighth embodiment of the present disclosure, the electronic device may control a display of information through the first and second windows as a gesture is input in the state that at least one part of the cover including the first and second windows does not cover the display screen.

Figure 20:
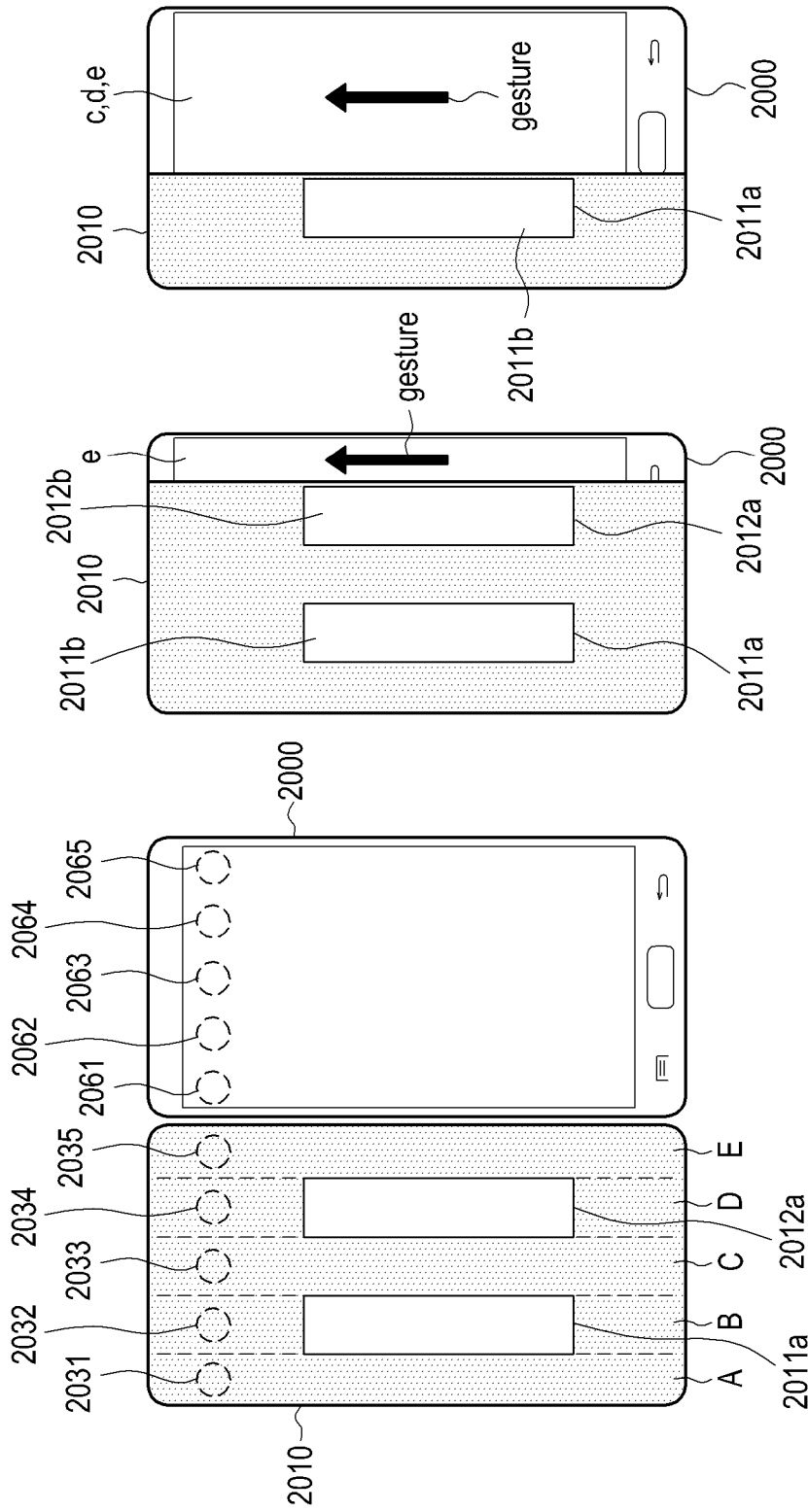
FIGS. 20A, 20B, and 20C are views illustrating a display of the electronic device depending on the status of the cover which covers the electronic device or is open according to an eighth embodiment of the present disclosure.

FIGS. 20A, 20B, and 20C are views illustrating a display of the electronic device depending on the status of the cover which covers the electronic device or is open according to an eighth embodiment of the present disclosure.

Referring to FIG. 20A, the electronic device 2000 may control a display of a first window area 2011*b* and a second window area 2012*a* as a user's gesture is input in an area of a display screen which is not covered with any part in the state that at least one of the parts A, B, C, D and E does not cover the display screen.

As shown in FIG. 20B, for example, when a user's gesture is input in an area e of the display screen when not covered, the electronic device 2000 may display predetermined information in one of or both the first window area 2011*b* and the second window area 2012*a* of the display screen based on an input gesture.

As shown in FIG. 20C, further, when a user's gesture is input in areas c, d and e of the display screen when areas c, d and e of the display screen are not covered, the electronic device 2000 may display predetermined information in the first window area 2011*b* of the display screen based on an input gesture.

According to the ninth embodiment of the present disclosure, the electronic device may display different information in a window area of the display screen corresponding to a window of the cover and an area of the display screen which is not covered, respectively, depending on a status of the cover of which at least one part covers the display screen or is open during an execution of the application.

Figure 21:
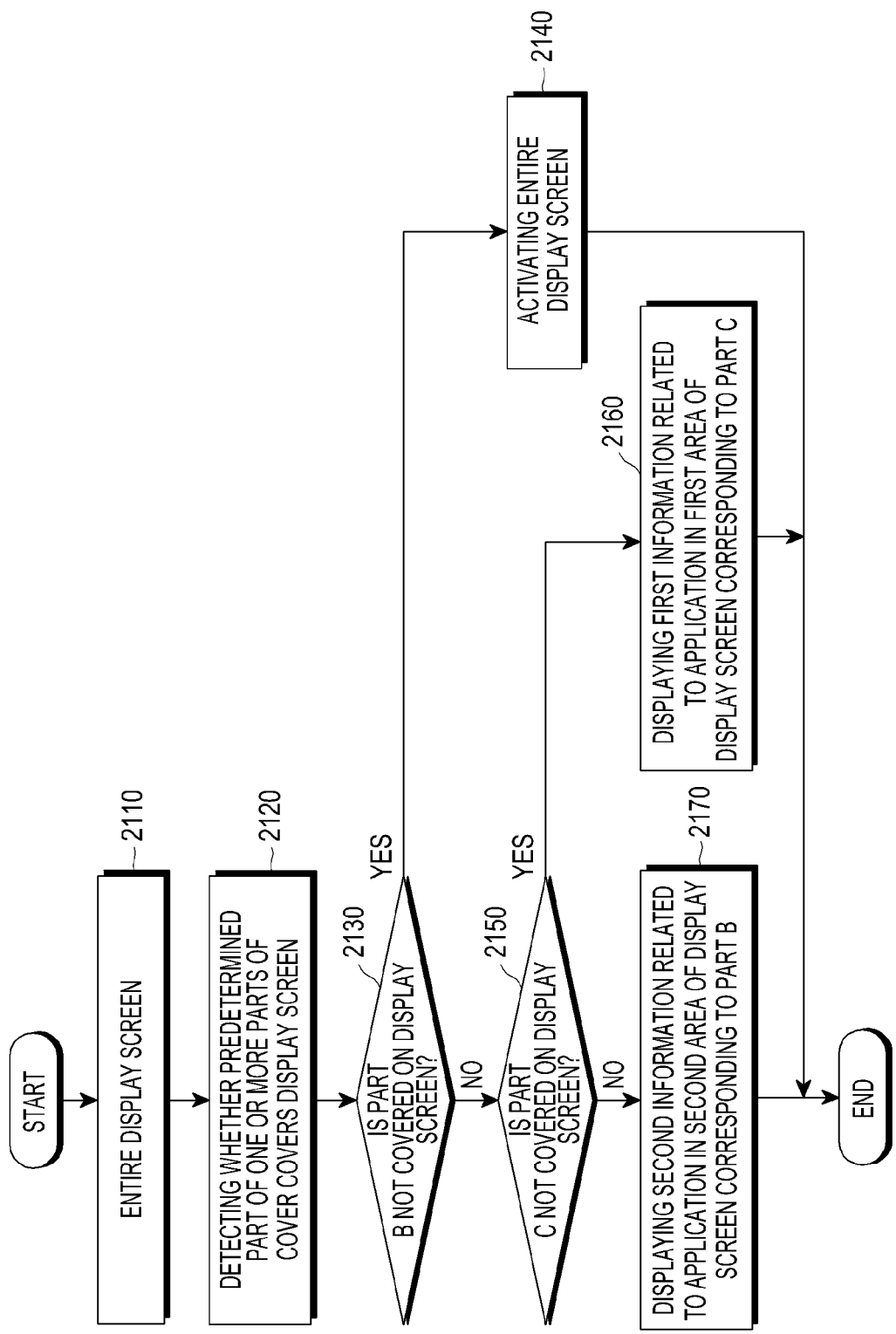
FIG. 21 is a flowchart illustrating an operation of an electronic device depending on a status of a cover which covers the electronic device or is open according to a ninth embodiment of the present disclosure.

FIG. 21 is a flowchart illustrating an operation of the electronic device depending on the status of the cover which covers the electronic device or is open according to the ninth embodiment of the present disclosure.

Figure 22:
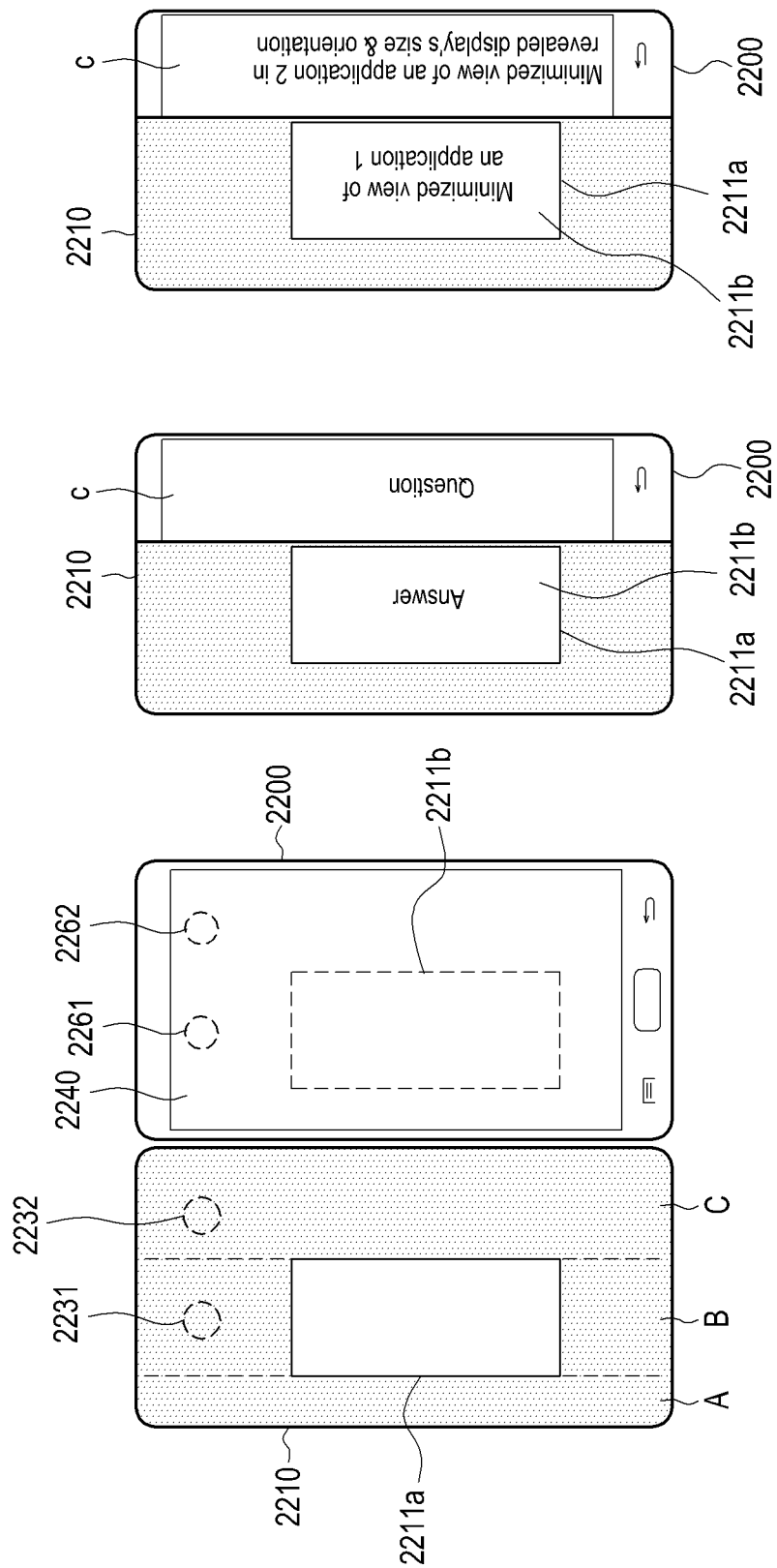
FIGS. 22A, 22B, and 22C are views illustrating a display of the electronic device depending on the status of the cover which covers the electronic device or is open according to the ninth embodiment of the present disclosure.

FIGS. 22A, 22B, and 22C are views illustrating a display of the electronic device depending on the status of the cover which covers the electronic device or is open according to the ninth embodiment of the present disclosure.

Referring to FIGS. 21, 22A, 22B, and 22C, the electronic device 2200 may execute an application in operation 2110. For example, the application may be a quiz application. The electronic device 2220 may detect whether predetermined parts B and C of the cover 2210 cover the display screen during the execution of the application.

The electronic device 2200 may determine whether the part B does not cover a front surface of the electronic device

2200 in operation 2130. If the part B does not cover the display screen, the electronic device 2200 may perform a corresponding function of displaying a display lock screen or activating the entire display screen in operation 2140.

If the part B covers the display screen, the electronic device 2200 may determine whether the part C does not cover the display screen in operation 2150. If the part C does not cover the display screen, the electronic device 2200 may display first information related to the application in a first area c of the display screen corresponding to the part C in operation 2160. If the part C does not cover the display screen, the electronic device 2200 may display second information related to the application in a window area 2211*b* of a second area of the display screen corresponding to the part B in operation 2170.

As shown in FIG. 22B, for example, in the case that the application is a quiz application, the electronic device 2200 may display a question related to the quiz application in the first area c when part C does not cover the display screen and display an answer related to the quiz application in the window area 2211*b*.

As shown in FIG. 22C, alternatively, the electronic device 2200 may display a minimized view of a second application different from a first application in a first area c when part C does not cover the display screen and display a minimized view of the first application in a window area 2211*b*.

According to the tenth embodiment of the present disclosure, on the other hand, the electronic device may display an application menu in a window area corresponding to a window included in any one of one or more parts when the parts of the cover the display screen and execute a corresponding application depending on a selection of a menu.

Figure 23:
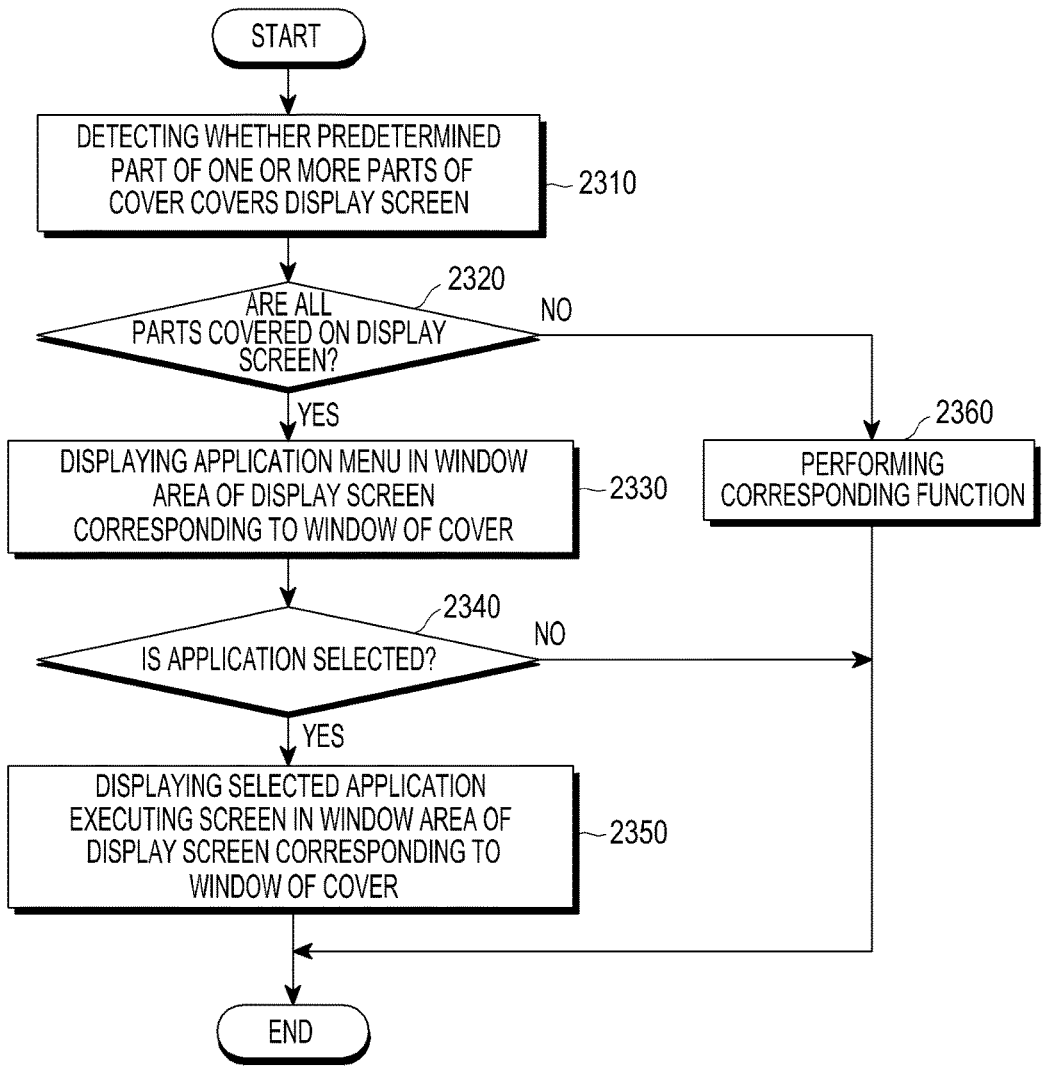
FIG. 23 is a flowchart illustrating an operation of an electronic device depending on a status of a cover which covers the electronic device or is open according to a tenth embodiment of the present disclosure.

FIG. 23 is a flowchart illustrating an operation of the electronic device depending on the status of the cover which covers the electronic device or is open according to the tenth embodiment of the present disclosure.

FIGS. 24A, 24B, 24C, and 24D are views illustrating a display of the electronic device depending on the status of the cover which covers the electronic device or is open according to the tenth embodiment of the present disclosure.

Referring to FIGS. 23, 24A, 24B, 24C, and 24D, the electronic device 2400 may detect whether one or more parts of the cover 2410 cover the display screen in operation 2310.

As the result of the detection, the electronic device 2400 may determine whether all the parts of the cover 2410 cover the display screen in operation 2320. If some parts do not cover the display screen, the electronic device 2400 may perform a corresponding function corresponding to the parts which do not cover the display screen in operation 2360.

If all parts of the cover 2410 cover the display screen, the electronic device 2400 may display an application menu in a window area 2411*b* of the display screen in operation 2330.

The electronic device 2400 may determine whether an application is selected from an application menu in operation 2340. If the application is selected, the electronic device 2400 may execute the selected application and display an application execution screen in the window area 2411*b*.

Figure 24:
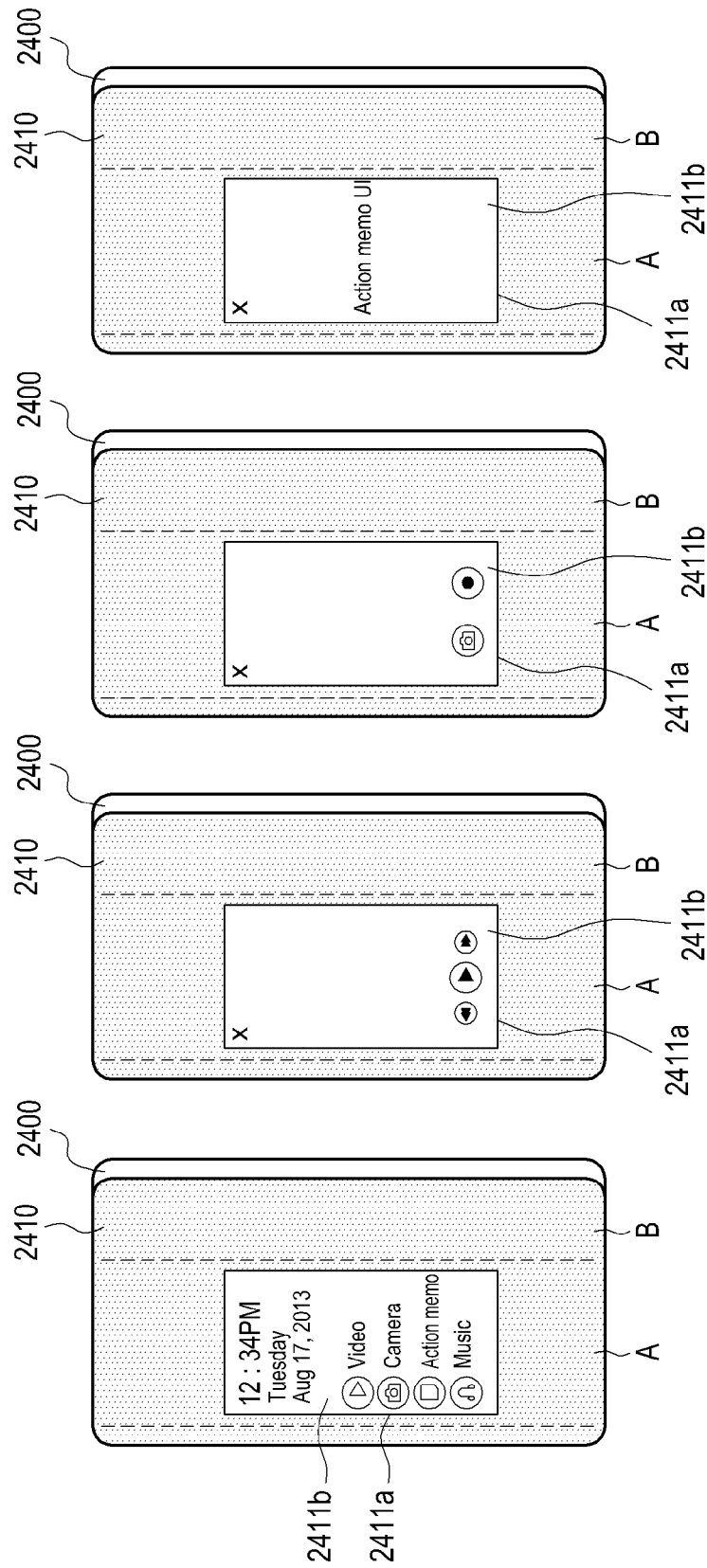
FIGS. 24A, 24B, 24C, and 24D are views illustrating a display of the electronic device depending on the status of the cover which covers the electronic device or is open according to the tenth embodiment of the present disclosure.

As shown in FIG. 24A, for example, if all parts of the cover 2410 cover the display screen, the electronic device 2400 may display a menu of a video application, a camera application, a memo application, and a music application in the window area 2411*b*. The electronic device 2400 may determine whether an application is selected from an application menu.

If the video application is selected, as shown in FIG. 24B, the electronic device 2400 may display the video application executing screen in the window area 2411*b*.

If the camera application is selected, as shown in FIG. 24C, the electronic device 2400 may display the camera application executing screen in the window area 2411*b* corresponding to the window 2411*a* formed in the cover 2410.

If the memo application is selected, as shown in FIG. 24D, the electronic device 2400 may display the memo application executing screen in the window area 2411*b*.

According to the eleventh embodiment of the present disclosure, on the other hand, the electronic device may display a recent application list on a screen when the cover has a window.

Figure 25:
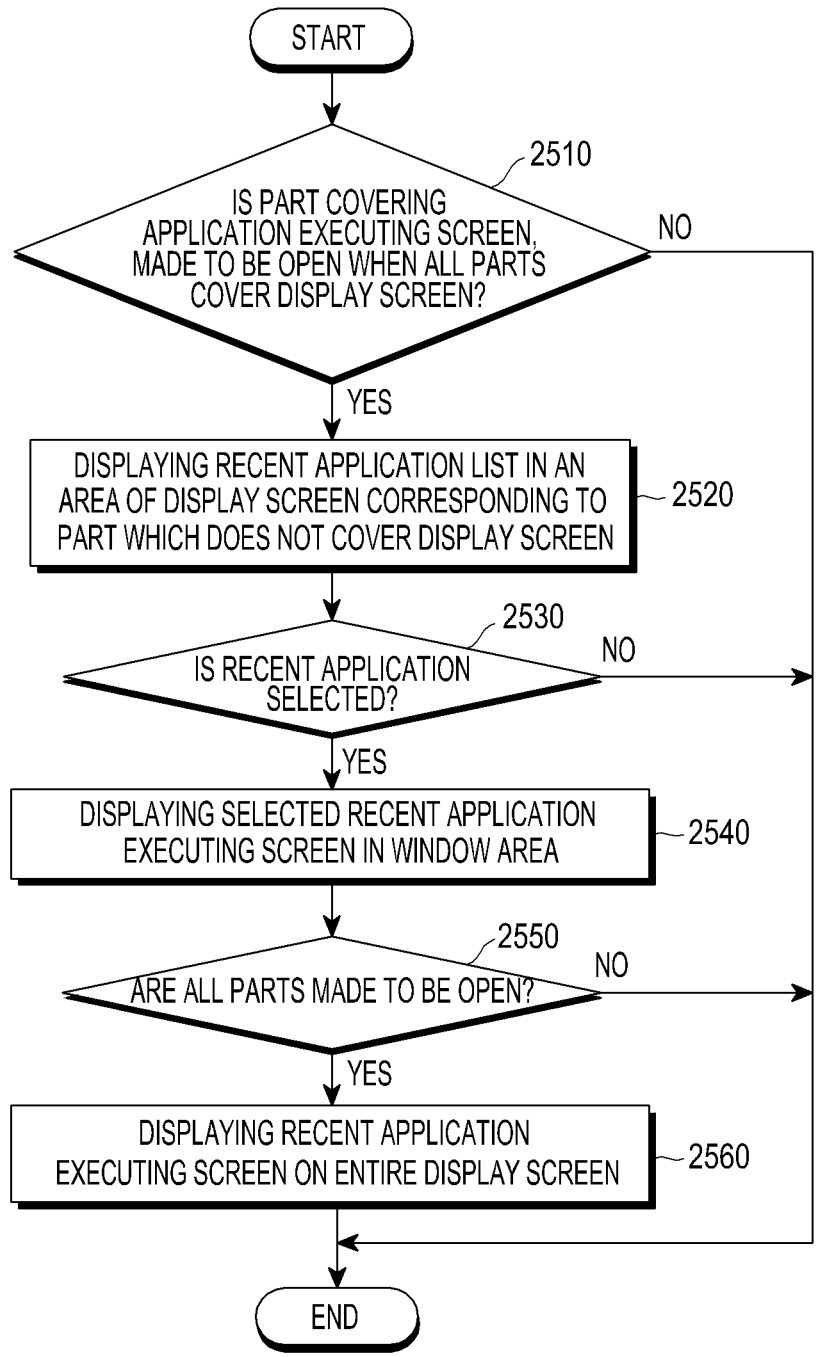
FIG. 25 is a flowchart illustrating an operation of an electronic device depending on a status of a cover which covers the electronic device or is open according to an eleventh embodiment of the present disclosure.

FIG. 25 is a flowchart illustrating an operation of the electronic device depending on the status of the cover which covers the electronic device or is open according to the eleventh embodiment of the present disclosure.

FIGS. 26A, 26B, 26C, 26D, 26E, 27A, and 27B are views illustrating a display of the electronic device depending on the status of the cover which covers the electronic device or is open according to the eleventh embodiment of the present disclosure.

Referring to FIGS. 25, 26A, 26B, 26C, 26D, 26E, 27A, and 27B, the electronic device 2600 may determine whether one of parts A and B of the cover 2610 is opened when both parts A and B cover the display screen in operation 2510. As shown in FIG. 26A, for example, the electronic device 2600 may determine whether the part B covering the application executing screen in the window area 2611*b* is opened when all parts A and B of the cover 2610 cover the display screen.

In operation 2520, the electronic device 2600 may display the recent application list in an area of the display screen corresponding to an opened part when one of the parts A and B of the cover 2610 is made to be open. As shown in FIG. 26B, for example, the electronic device 2600 may display the recent application list in an area b of the display screen. At this time, in the recent application list, recently executed applications may be displayed in sequence.

The electronic device 2600 may determine whether the recent application is selected from the recent application list in operation 2530. For example, the user may select a desired application from the recent application list through an input of a user gesture.

If the recent application is selected, the electronic device 2600 may display the selected application executing screen in the window area 2611*b* in operation 2540. As shown in FIG. 26C, for example, if the video application is selected from the recent application list, the electronic device 2600 may display the video application executing screen in the window area 2611*b*. At this time, the electronic device 2600 may display information related to an execution of the video application in the area b of the display screen. In the case that the video application execution screen is displayed in the window area 2611*b*, for example, a list of video files to be reproduced may be displayed in the area b of the display screen.

As shown in FIG. 26D, for example, if the camera application is selected from the recent application list, the electronic device 2600 may display the camera application executing screen in the window area 2611*b*. At this time, the electronic device 2600 may display information related to an execution of the camera application in the area b of the display screen. In the case that the camera application executing screen is displayed in the window area 2611*b*, for example, a list of photographed images may be displayed in the area b of the display screen.

As shown in FIG. 26E, for example, if the memo application is selected from the recent application list, the electronic device 2600 may display the memo application executing screen in the window area 2611b. At this time, the electronic device 2600 may display information related to an execution of the memo application in the area b of the display screen. In the case that the memo application executing screen is displayed in the window area 2611b, for example, a list of memos may be displayed in the area b of the display screen.

Figure 27A:
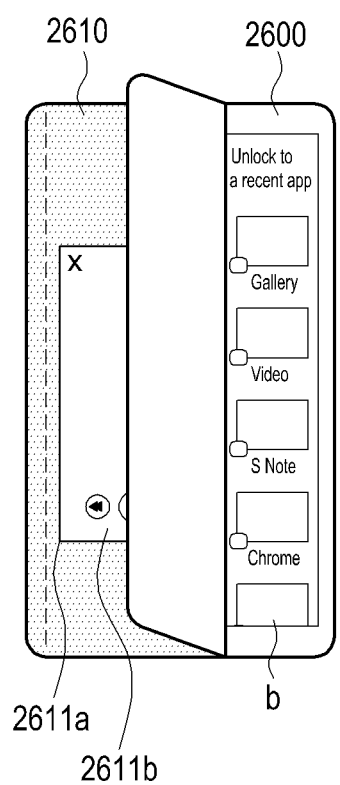
Figure 27B:
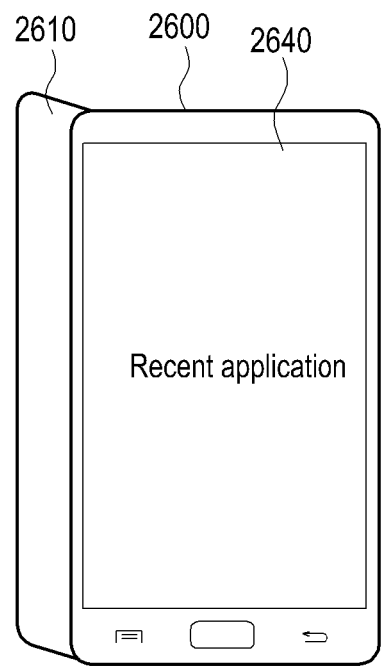

The electronic device 2600 may determine whether both parts A and B of the cover 2610 are made to be open in operation 2550. If both parts A and B of the cover 2610 are made to be open, the electronic device 2600 may display the recent application executing screen on the entire display screen in operation 2560. When part A covers the display screen and part B does not as shown in FIG. 27A, if both parts are made to be open, then the electronic device 2600 may display the recent application executing screen in the entire area of the display screen 2640 as illustrated in FIG. 27B.

According to various embodiments of the present disclosure, since the cover of the electronic device is configured to have one or more parts, it is convenient for the user to cover the display unit of the electronic device with each part of the cover when the electronic device is covered with the cover.

According to the various embodiment of the present disclosure, further, since at least one window is formed in the cover, there is an advantage in that a user can view information displayed on the display unit through the at least one window even though the display unit of the electronic device is covered with the cover.

According to the various embodiment of the present disclosure, further, it is possible for the electronic device to determine which part the cover covers a specific area of the display unit and perform the function according to the part covering the specific area of the display unit.

According to the various embodiment of the present disclosure, further, it is possible to control a display of a window area of the display unit corresponding to the window of the cover according to the status of the cover of which a part having the window covers the display unit or is open.

According to the various embodiments of the present disclosure, furthermore, it is possible for a user to set which information is displayed in a window area of the display unit of the electronic device corresponding to the window of the cover.

Figures 28A, 28B:
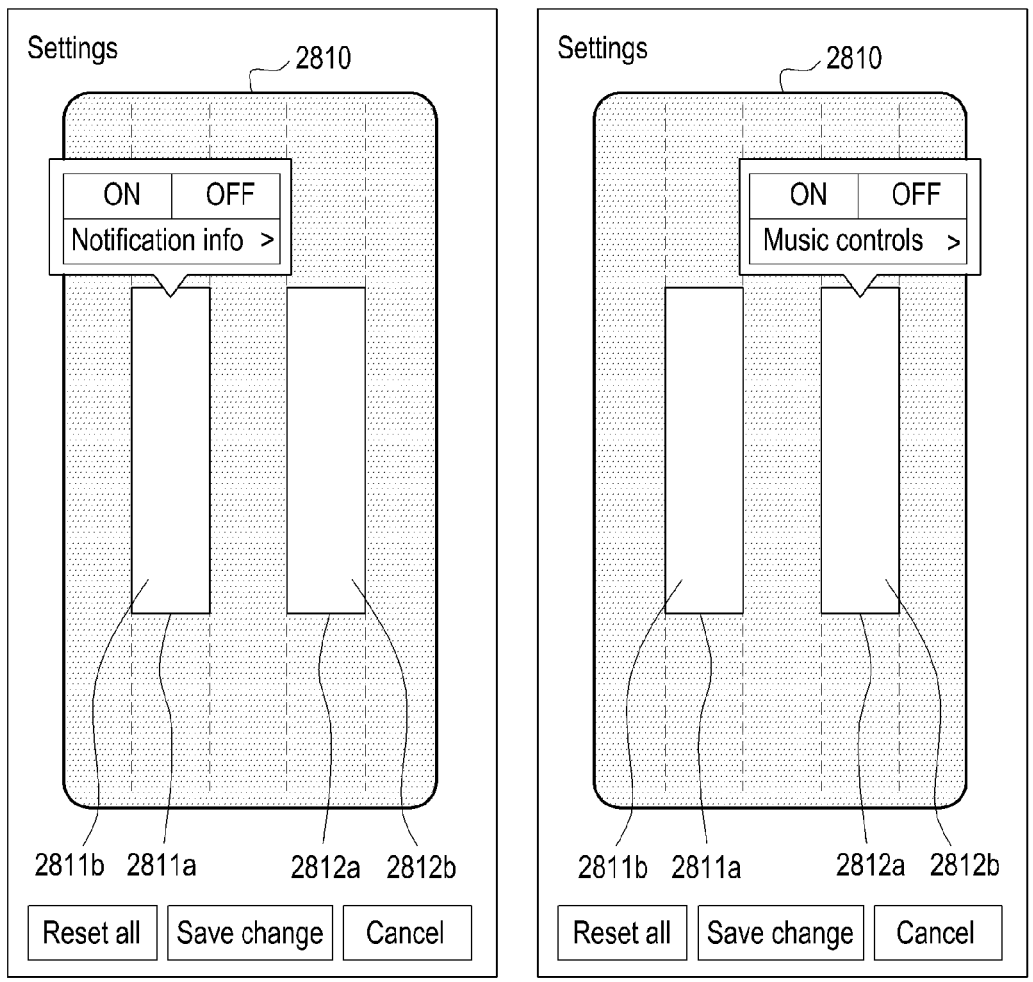
FIGS. 28A and 28B are views illustrating a process of setting an area of the electronic device corresponding to the window of the cover according to an embodiment of the present disclosure.

FIGS. 28A and 28B are views illustrating a process of setting a window area of the electronic device corresponding to the window of the cover according to the embodiment of the present disclosure.

Referring to FIGS. 28A and 28B, in the case that the cover 2810 includes two windows of a first window 2811a and a second window 2812a, the electronic device may perform a setting of a first window area 2811b and a second window area 2812b corresponding to the first window 2811b and the second window 2812b of the cover 2810 according to a user's selection.

As shown in FIGS. 28A and 28B, the electronic device may display information on the first window area 2811b and a second window area 2812b respectively, by using any one of a turning on and a turning off, and may set information displayed in the first and second window areas 2811b and 2812b as various sorts of information such as notification information or music control information. According to the embodiment of the present disclosure, the setting of the first window area 2811b and the second window area 2812b in various conditions may be performed.

In the embodiment of the present disclosure, although it has been described as an example that the first window area 2811b and the second window area 2812b are displayed, the number and the size of the window areas may be varied according to the number and the size of the windows of the cover.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display configured to display information; and
    a processor configured to:
        detect whether a cover detachably coupled to the electronic device is entirely disposed over the display,
        perform a first function corresponding to a first area of the display that is exposed by at least one window of the cover, if the cover is entirely disposed over the display, and
        when the first function is performed, display first information related to the first function on the first area,
    wherein the first information is displayed to be visually viewable through the at least one window, and
    wherein the cover includes the at least one window.

2. The electronic device of claim 1, further comprising:
    a magnetic force detecting sensor configured to detect a magnetic force generated when the cover is disposed over the display.

3. The electronic device of claim 1, wherein, in response to exposing a second area of the display by removing a portion of the cover from the display, the processor is further configured to display set information in the second area.

4. The electronic device of claim 3, wherein the processor is further configured to:
    set whether information is displayed on the first area, and
    sort the information displayed on the second area.

5. The electronic device of claim 1, wherein the processor is configured to perform a second function corresponding to an input of a user gesture when the user gesture is input in the first area.

6. The electronic device of claim 1, wherein, in response to exposing a second area of the display by removing a portion of the cover from the display, the processor is further configured to:
    display second information related to an application on the second area of the display,
    wherein the first information is related to the application.

7. The electronic device of claim 1, wherein, in response to exposing a second area of the display by removing a portion of the cover from the display, the processor is further configured to display a recent application list on the second area.

8. The electronic device of claim 7, wherein, in response to entirely removing the cover from the display during the display of the recent application list, the processor is further configured to display information related to a recent application execution.

9. A method of performing a function, the method comprising:

detecting whether a cover is entirely disposed over a display of an electronic device, wherein the cover includes at least one window to expose a first area of the display;

performing a first function corresponding to the first area exposed by the at least one window of the cover, if the cover is entirely disposed over the display; and when the first function is performed, displaying first information related to the first function on the first area, wherein the first information is visually viewable through the at least one window of the cover, and wherein the cover is configured to be detachably coupled to the electronic device to cover the display.

10. The method of claim 9, wherein the detecting of whether the cover is entirely disposed over the display includes detecting a magnetic force generated when the cover is disposed over the display.

11. The method of claim 9, further comprising:
determining whether a user gesture is input in the first area; and
performing a second function corresponding to the input of the user gesture.

12. The method of claim 9, further comprising:
determining if a portion of the cover is removed from the display to expose a second area of the display; and
in response to exposing the second area, displaying second information related to an application on the second area,
wherein the first information is related to the application.

13. The method of claim 9, further comprising:
determining if a portion of the cover is removed from the display to expose a second area of the display; and
displaying a recent application list on the second area.

14. The method of claim 13, further comprising:
if the cover is removed from the display while displaying the recent application list, displaying information related to a recent application execution on the display.

15. The method of claim 9, further comprising:
setting whether information is displayed on the first area; and
sorting the information displayed on the second area.

16. A cover of an electronic device that is detachably coupled to an electronic device, the cover comprising:
a plurality of cover parts that are separately moveable and are positioned over a display of the electronic device to cover the display,
wherein the cover parts are selectively configured to cover the display of the electronic device, and
wherein a first region of the cover parts includes at least one window to expose a first area of the display while covering the display.

17. The cover of claim 16, wherein at least one cover part of the plurality of cover parts comprises a magnetic force applying unit.

18. The cover of claim 16, wherein at least one cover part of the plurality of cover regions comprises a touch protrusion formed thereon.

19. The cover of claim 16, wherein the at least one window comprises a transparent material or is perforated in the form of an opening.

* * * * *